United States Patent
Wen et al.

(10) Patent No.: US 10,489,215 B1
(45) Date of Patent: Nov. 26, 2019

(54) LONG-RANGE DISTRIBUTED RESOURCE PLANNING USING WORKLOAD MODELING IN HYPERCONVERGED COMPUTING CLUSTERS

(71) Applicant: Nutanix, Inc., San Jose, CA (US)

(72) Inventors: Jianjun Wen, San Jose, CA (US);
Cong Liu, Foster City, CA (US);
Himanshu Shukla, San Jose, CA (US);
Weiheng Chen, Seattle, WA (US)

(73) Assignee: NUTANIX, INC., San Jose, CA (US)

( * ) Notice: Subject to any disclaimer, the term of this patent is extended or adjusted under 35 U.S.C. 154(b) by 195 days.

(21) Appl. No.: 15/341,549

(22) Filed: Nov. 2, 2016

(51) Int. Cl.
G06F 9/50 (2006.01)
H04L 12/911 (2013.01)
H04L 29/08 (2006.01)

(52) U.S. Cl.
CPC ............ *G06F 9/5077* (2013.01); *H04L 47/78* (2013.01); *H04L 47/823* (2013.01); *H04L 67/1012* (2013.01); *G06F 2209/506* (2013.01); *G06F 2209/5019* (2013.01)

(58) Field of Classification Search
CPC ........... G06F 9/5077; G06F 2209/5019; G06F 2209/506; H04L 47/823; H04L 47/78; H04L 67/1012
See application file for complete search history.

(56) References Cited

U.S. PATENT DOCUMENTS

| | | |
|---|---|---|
| D671,550 S | 11/2012 | Chen et al. |
| 8,549,518 B1 | 10/2013 | Aron et al. |
| 8,601,473 B1 | 12/2013 | Aron et al. |
| D703,690 S | 4/2014 | Maccubbin et al. |
| D714,335 S | 9/2014 | Cojuangco et al. |
| 8,850,130 B1 | 9/2014 | Aron et al. |

(Continued)

OTHER PUBLICATIONS

Lama et al. ("AROMA: Automated Resource Allocation and Configuration of MapReduce Environment in the Cloud", ICAC'12, Sep. 2012) (Year: 2012).*

(Continued)

*Primary Examiner* — Francisco J Aponte
*Assistant Examiner* — Kevin X Lu
(74) *Attorney, Agent, or Firm* — Vista IP Law Group, LLP

(57) ABSTRACT

Systems for computing cluster management. One embodiment commences upon receiving a set of observed workload parameters corresponding to one or more observable workloads that run in a computing cluster. While the workloads are running, workload stimulus and cluster response observations are taken and used to generate a workload resource usage predictive model based on mappings or correlations between the observable workloads parameters and observed resource usage measurements. A set of planned workloads are applied to the workload resource usage predictive model to predict a set of corresponding predicted resource usage demands. The predicted resource usage demands are then mapped to a set of recommended hardware to form resource deployment recommendations that satisfy at least some of the corresponding resource usage demands while also observing a set of hardware model compatibility constraints. The resource deployment recommendations that satisfy the set of hardware model compatibility constraints are displayed in a user interface.

20 Claims, 24 Drawing Sheets

(56) References Cited

U.S. PATENT DOCUMENTS

| | | | |
|---|---|---|---|
| D757,042 S | 5/2016 | Zankowski et al. | |
| D764,507 S | 8/2016 | Gansca et al. | |
| D766,268 S | 9/2016 | Katz | |
| D772,266 S | 11/2016 | Eder | |
| D772,913 S | 11/2016 | Binder et al. | |
| D777,754 S | 1/2017 | Binder et al. | |
| D783,667 S | 4/2017 | Jung et al. | |
| 9,699,024 B2* | 7/2017 | Bone | H04L 41/0806 |
| D795,272 S | 8/2017 | Laing et al. | |
| 9,772,866 B1 | 9/2017 | Aron et al. | |
| 2007/0027736 A1 | 2/2007 | Reynolds et al. | |
| 2008/0271038 A1 | 10/2008 | Rolia et al. | |
| 2010/0131844 A1 | 5/2010 | Wohlert et al. | |
| 2013/0185433 A1 | 7/2013 | Zhu et al. | |
| 2013/0227490 A1 | 8/2013 | Thorsander et al. | |
| 2014/0013368 A1* | 1/2014 | Barrett | H04N 21/23116 725/97 |
| 2014/0136295 A1* | 5/2014 | Wasser | G06Q 10/06312 705/7.38 |
| 2014/0157204 A1 | 6/2014 | Roberts et al. | |
| 2014/0365952 A1 | 12/2014 | Honeyman et al. | |
| 2016/0018979 A1 | 1/2016 | Sunder et al. | |
| 2017/0214584 A1 | 7/2017 | Kanojia et al. | |
| 2017/0277531 A1* | 9/2017 | McGrath | G06F 8/65 |
| 2017/0357533 A1* | 12/2017 | Chaganti | G06F 9/5011 |
| 2018/0113742 A1* | 4/2018 | Chung | G06F 9/5005 |

OTHER PUBLICATIONS

Neeraja Yadwadkar, "machine learning for automatic resource management in the Datacenter and the cloud", Technicaql Report No. UCB EECS-2018-110, Aug. 10, 2018 (Year: 2018).*

U.S. Appl. No. 15/230,147, filed Aug. 5, 2016, 57 pages.

Non-Final Office Action dated Sep. 1, 2017 for related U.S. Appl. No. 29/583,163.

Non-Final Office Action dated Sep. 1, 2017 for related U.S. Appl. No. 29/583,172.

Notice of Allowance dated Apr. 12, 2018 for related U.S. Appl. No. 29/583,163.

Notice of Allowance dated Apr. 12, 2018 for related U.S. Appl. No. 29/583,172.

VMware vCenter CapacityIQ Evaluator's Guide. 2009. 46 pages.

Non-Final Office Action dated Sep. 21, 2018 for related U.S. Appl. No. 15/341,652, 19 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Final Office Action dated Mar. 8, 2019 for related U.S. Appl. No. 15/341,652, 18 pages.

* cited by examiner

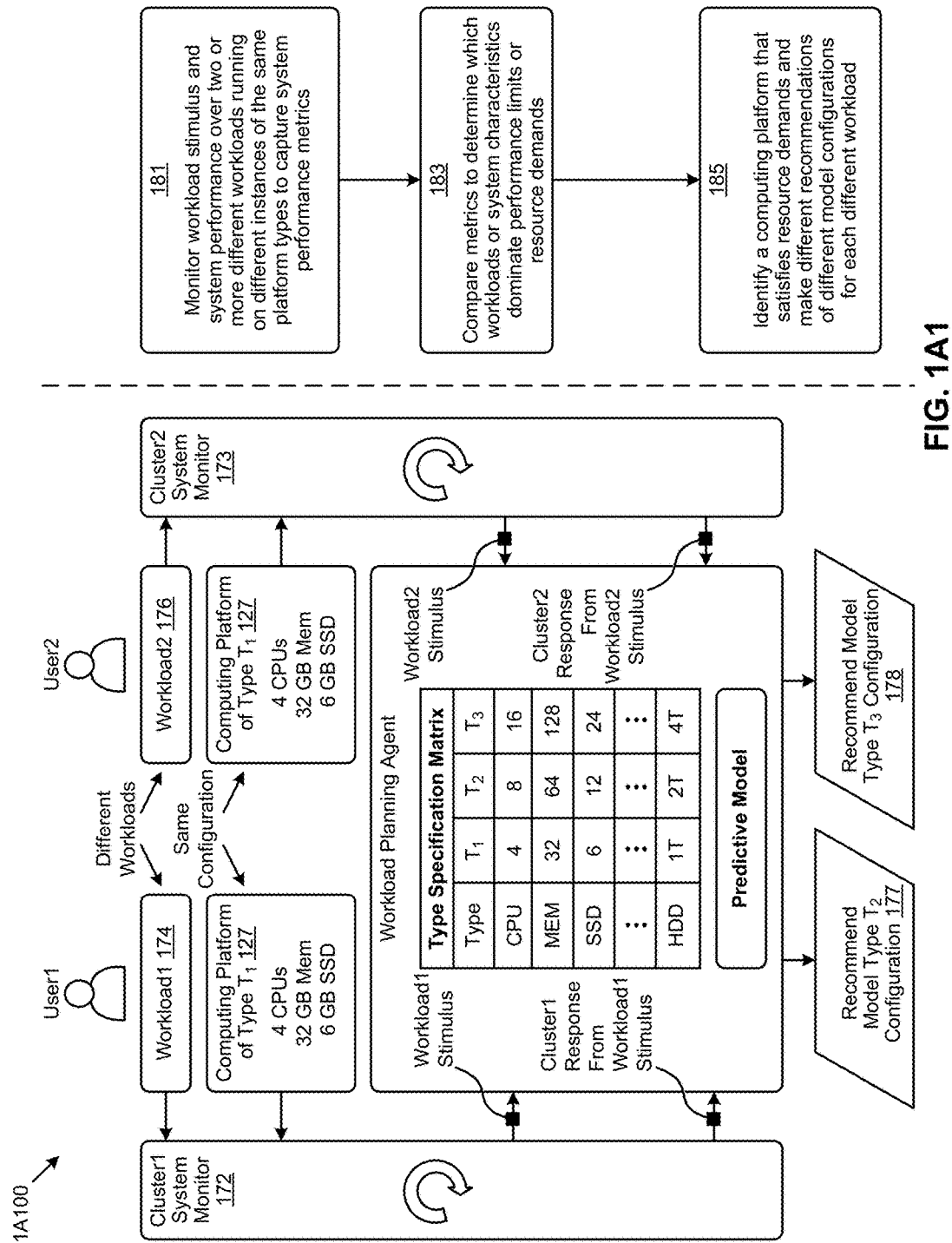
FIG. 1A1

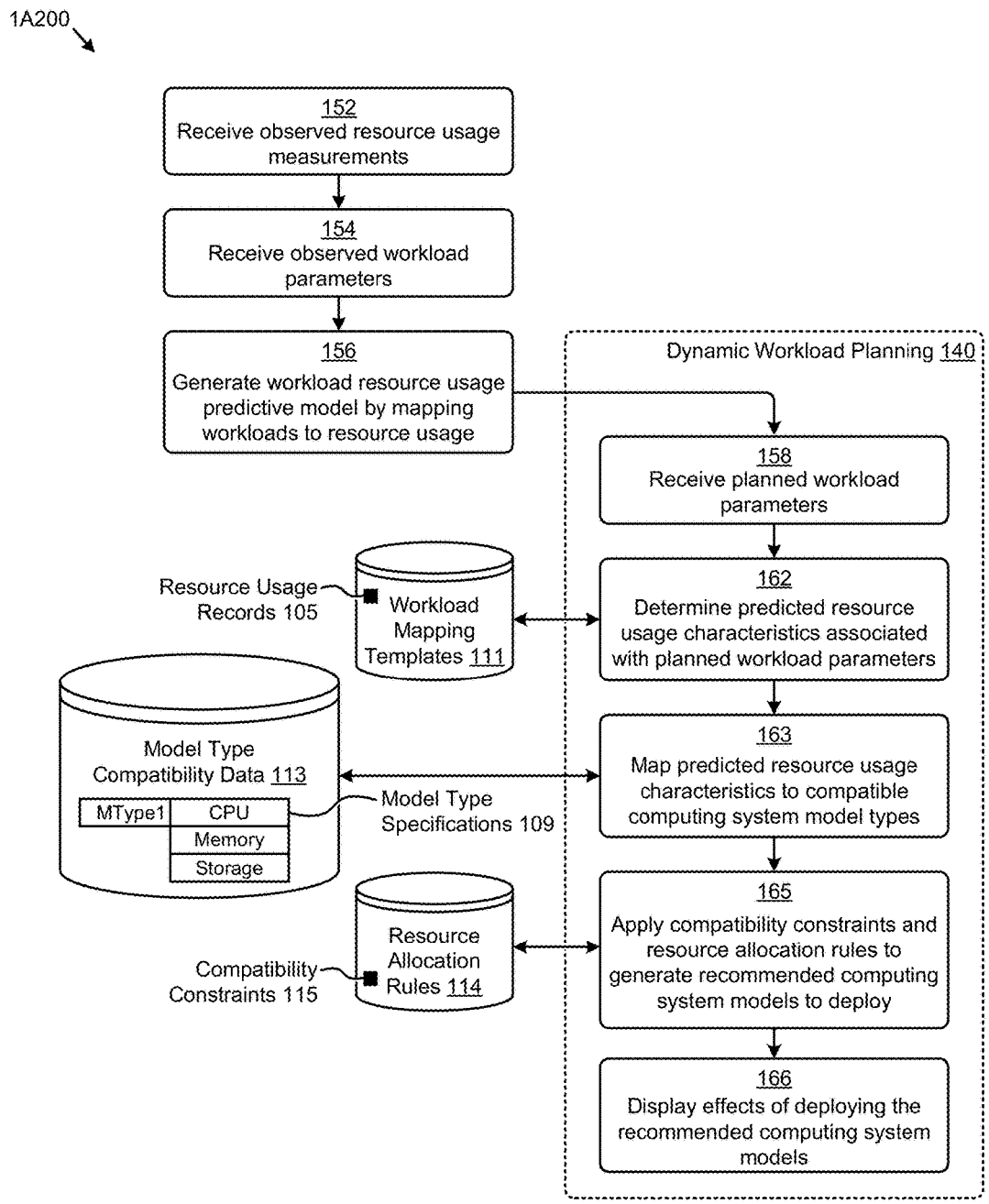
FIG. 1A2

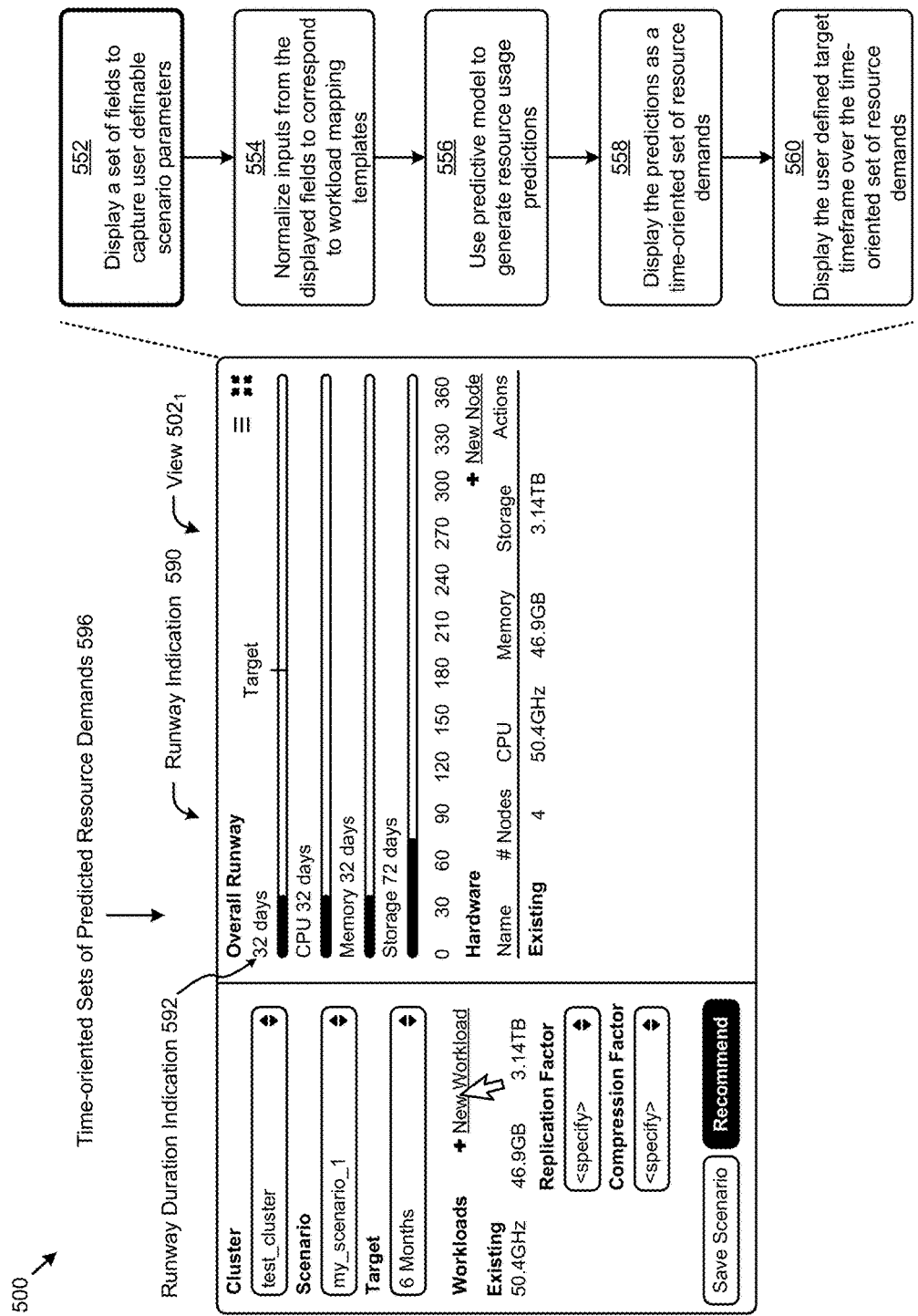
FIG. 5A1

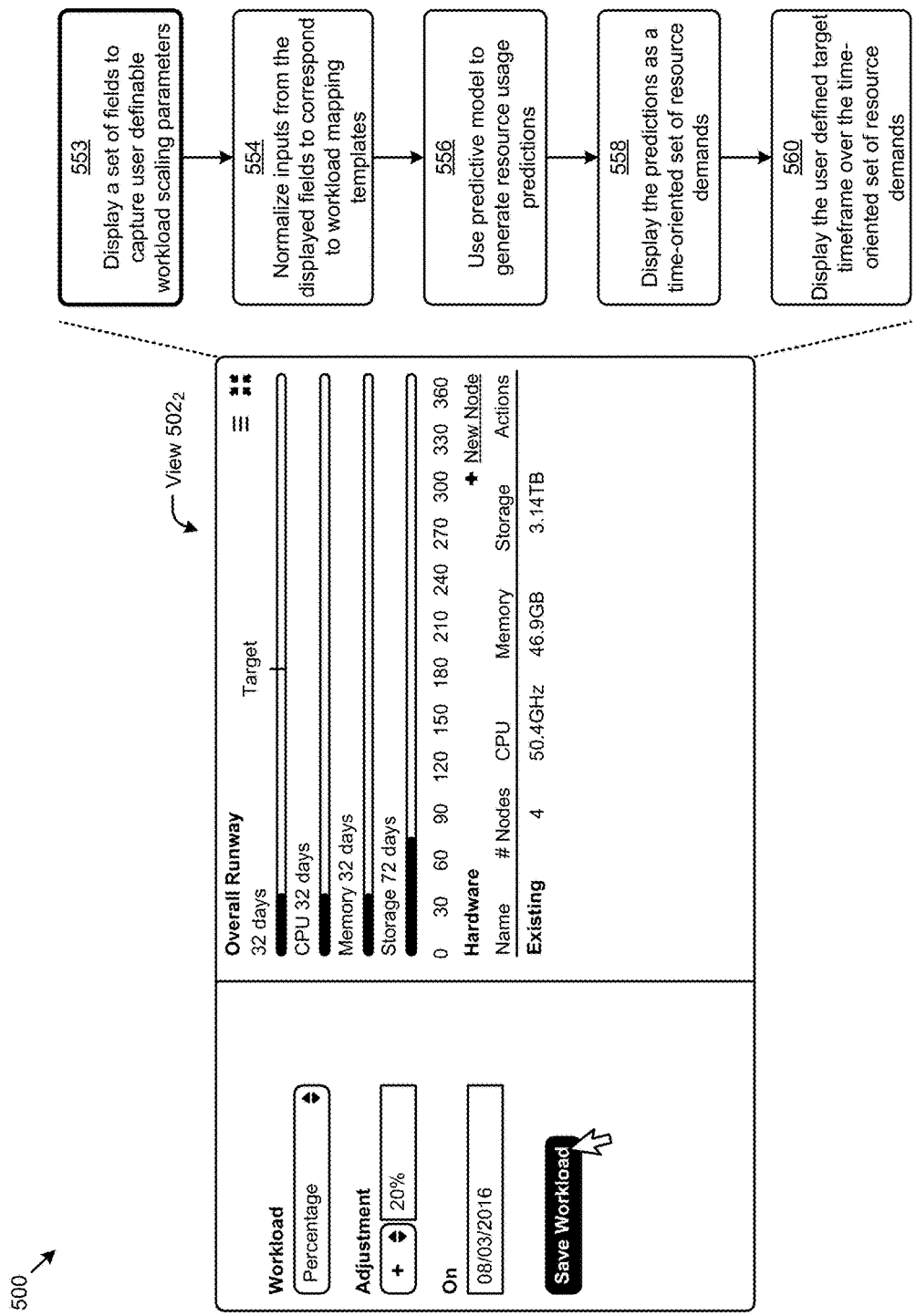
FIG. 5A2

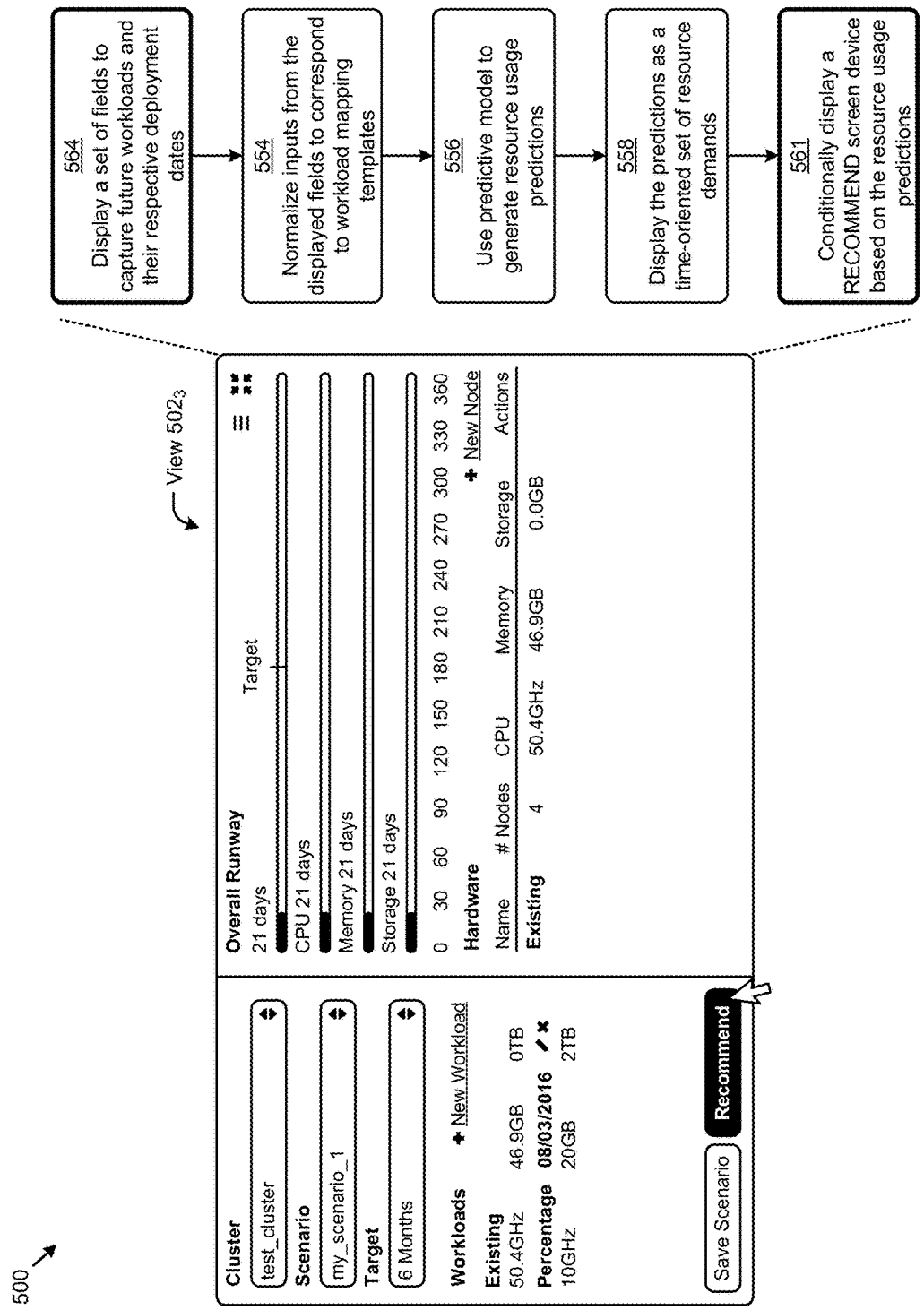
FIG. 5B1

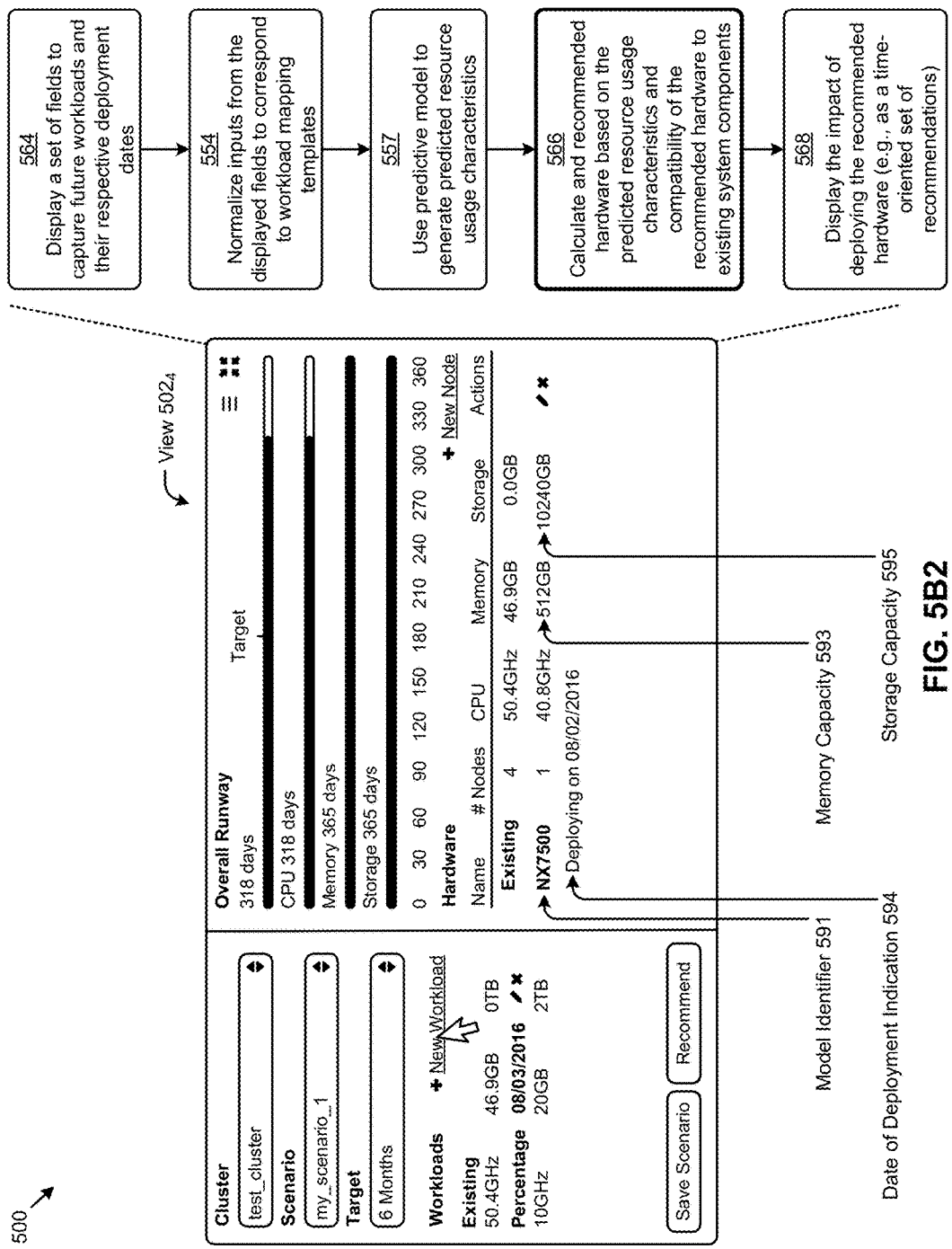
FIG. 5B2

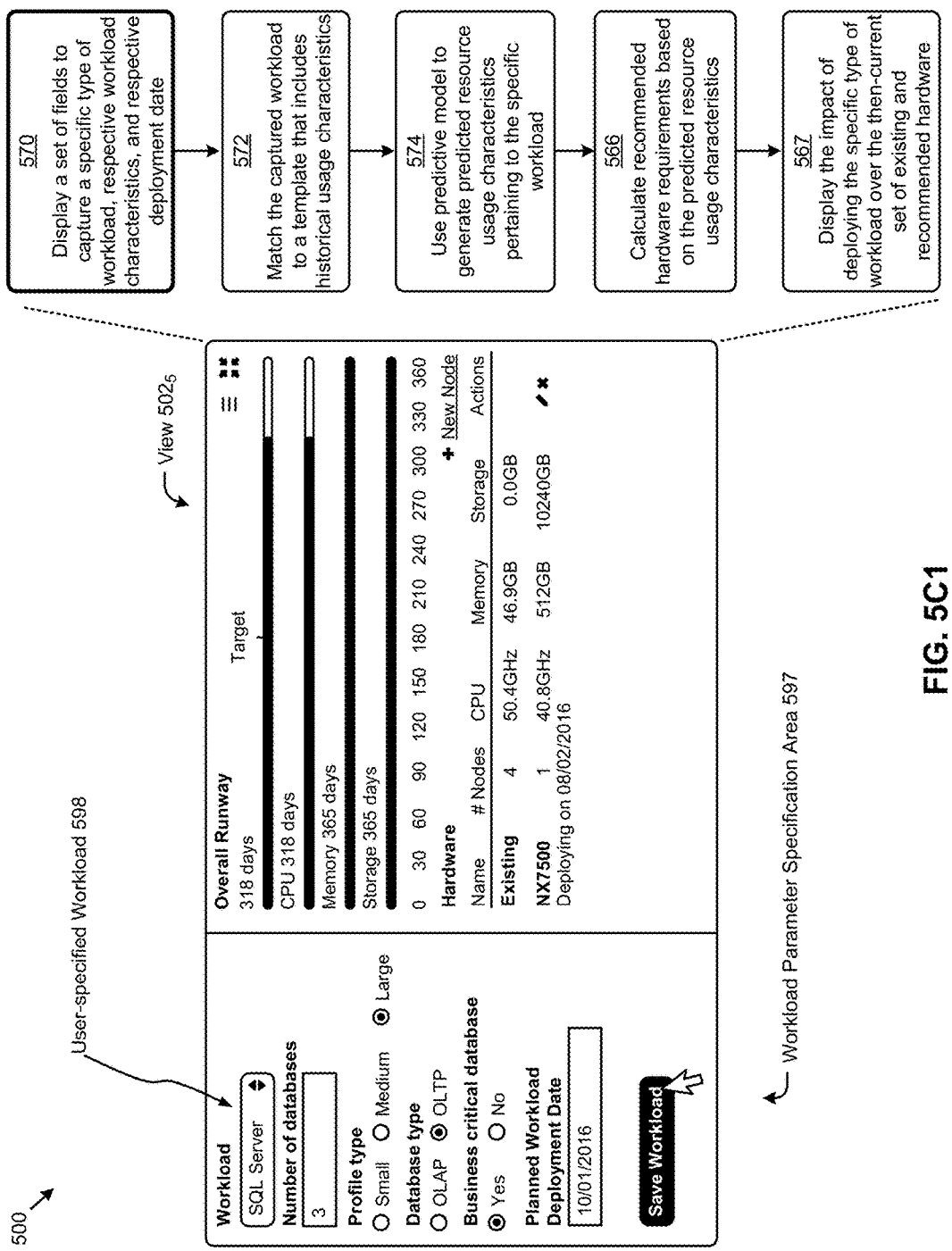
FIG. 5C1

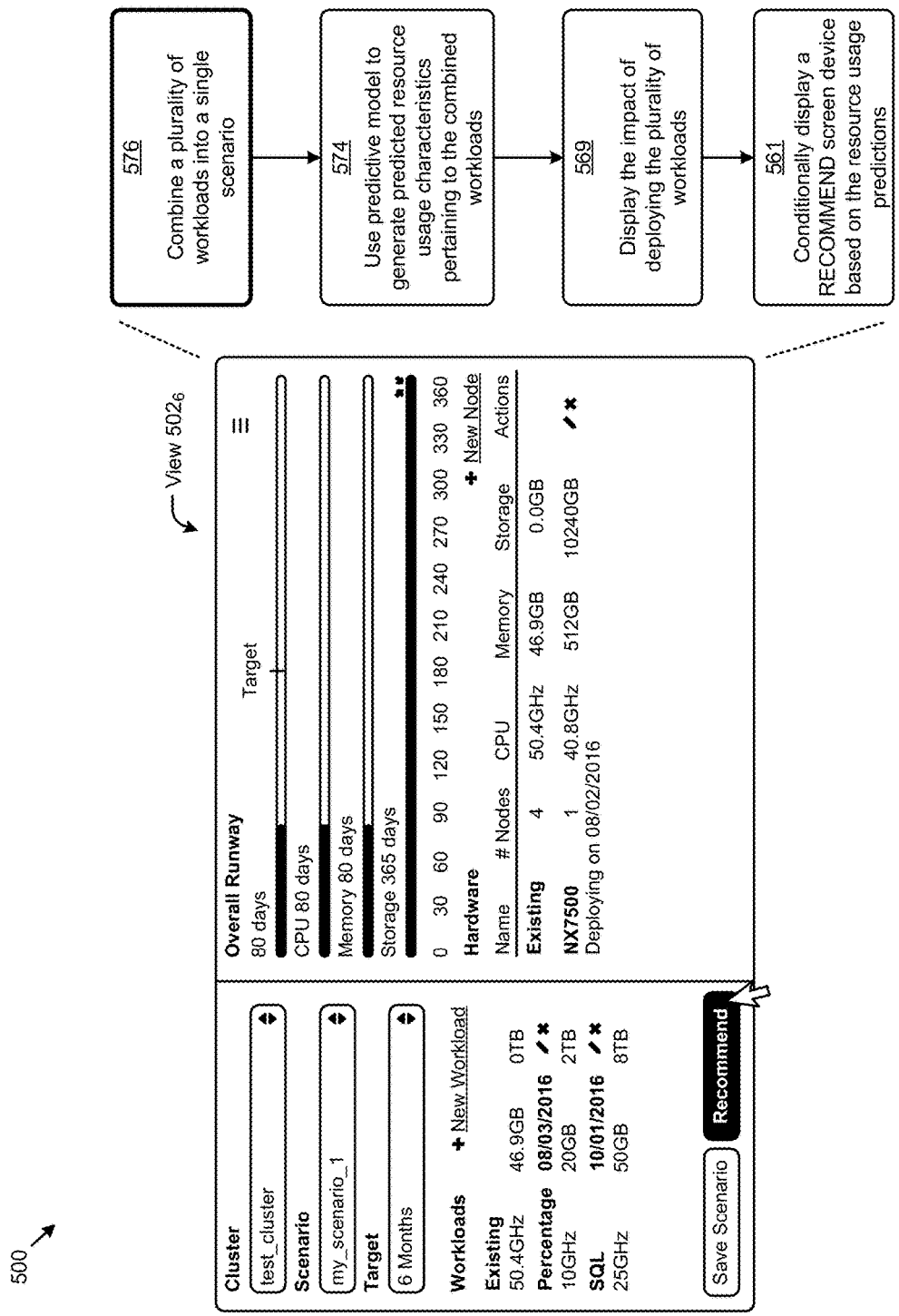
FIG. 5C2

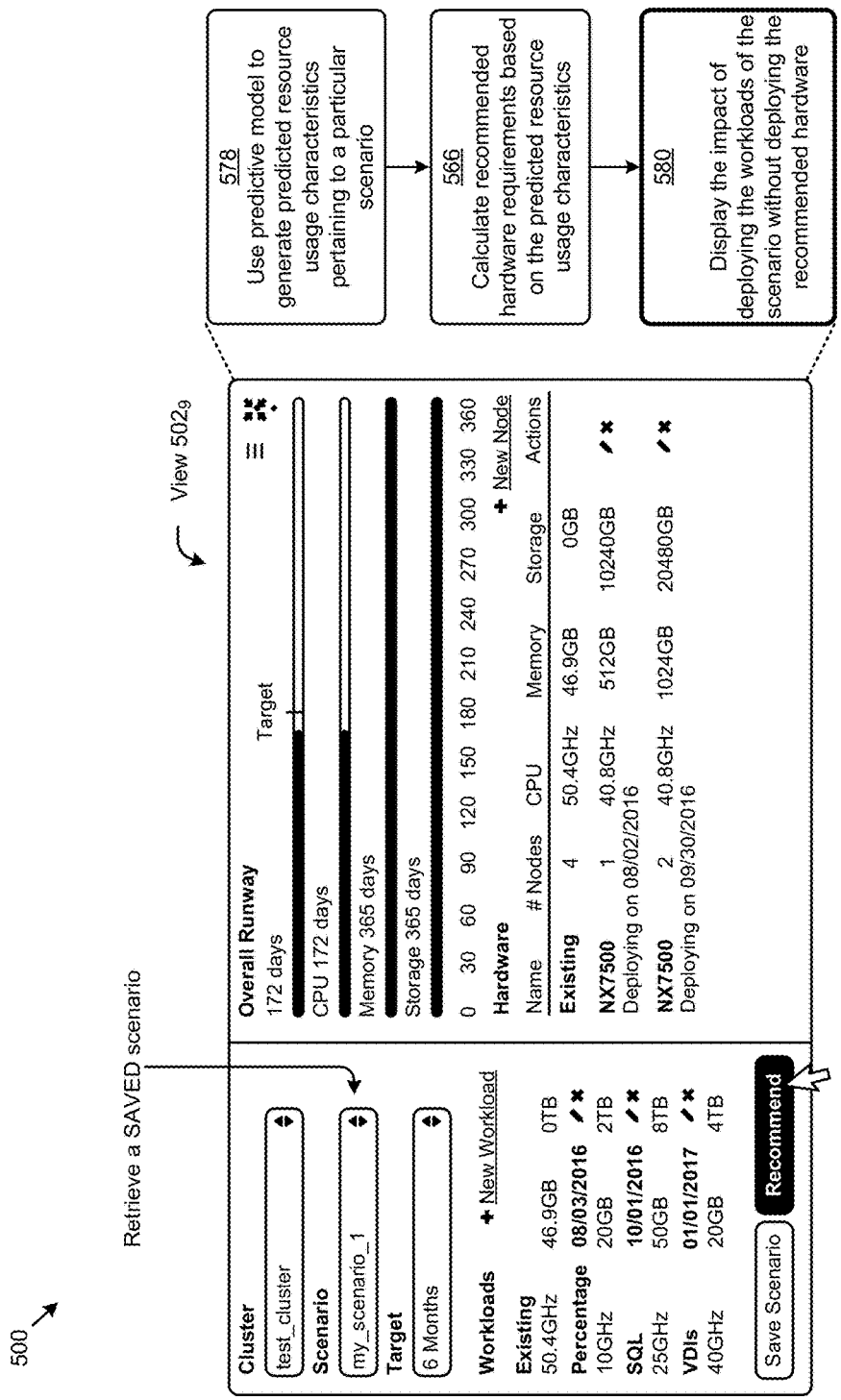
FIG. 5E1

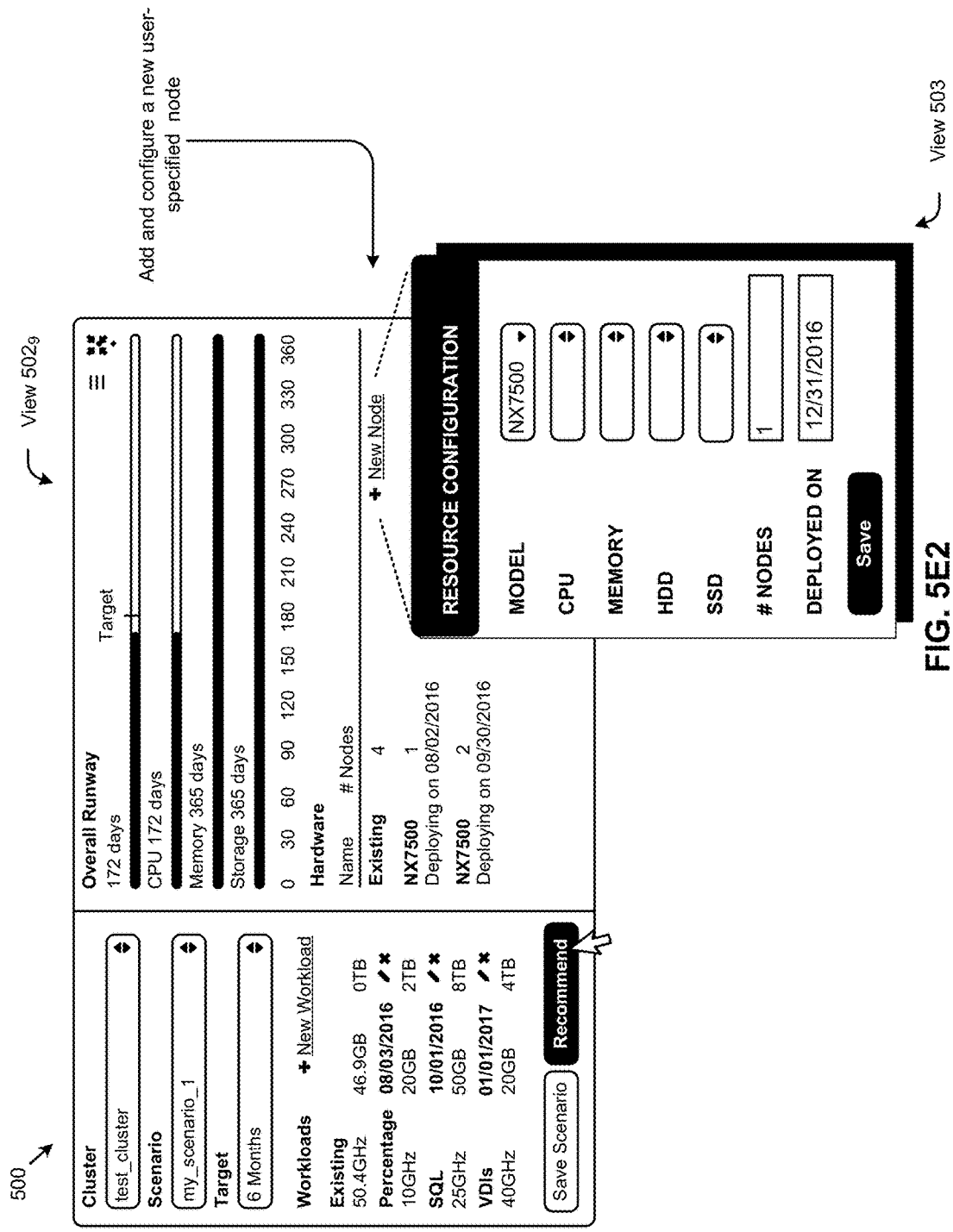
FIG. 5E2

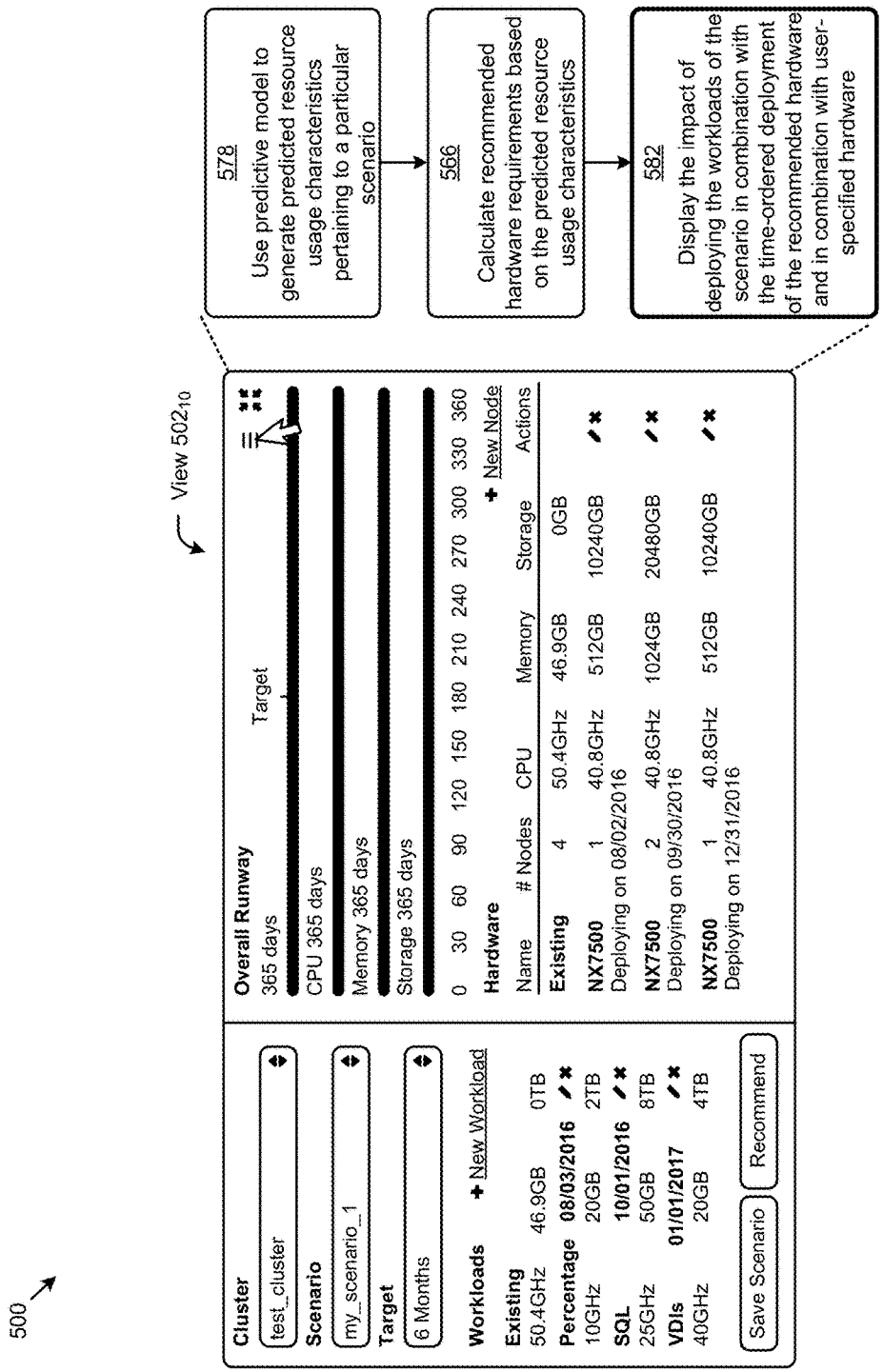
FIG. 5E3

LONG-RANGE DISTRIBUTED RESOURCE PLANNING USING WORKLOAD MODELING IN HYPERCONVERGED COMPUTING CLUSTERS

RELATED APPLICATIONS

The present application is related to co-pending U.S. patent application Ser. No. 15/341,652 titled "LONG-RANGE DISTRIBUTED RESOURCE PLANNING FOR HYPERCONVERGED COMPUTING CLUSTERS USING INTERACTIVE USER INTERFACES"; and the present application is related to U.S. Design Pat. No. D826,952 titled "GRAPHICAL USER INTERFACE FOR A DISPLAY SCREEN OR PORTION THEREOF"; and the present application is related to U.S. Design Pat. No. D826,239 titled "GRAPHICAL USER INTERFACE FOR A DISPLAY SCREEN OR PORTION THEREOF", all of which are hereby incorporated by reference in their entirety.

BACKGROUND

The resource usage efficiencies offered by hyperconverged distributed computing and storage systems has resulted in a continually increasing rate of deployment of such systems. The multidimensional scaling of such deployments leads to more efficient overall resource usage. Certain deployments support scaling in terms of computing capability as well as scaling in terms of storage capabilities. As such, certain components in a distributed computing system can be deployed to coordinate utilization of computational or compute resources, while certain other components of a distributed storage system can be deployed to efficiently coordinate use of data storage resources or facilities. A hyperconverged distributed system coordinates efficient use of compute and storage resources by and between the components of the distributed system. Some distributed systems support virtualized entities (VEs) that can be distributed across a possibly large number of computing components.

For example, a distributed virtualization system might include virtual machines (VMs) distributed across a possibly large number of nodes. Such VMs can be characterized as software-based computing "machines" implemented in a hypervisor-assisted virtualization environment that emulates the underlying hardware resources (e.g., CPU, memory, etc.). Multiple VMs can operate on one physical machine (e.g., host computer) running a single host operating system, while the VMs might run multiple applications on various respective guest operating systems. Another form of virtualization in modern distributed systems is operating system virtualization or container virtualization. The containers implemented in container virtualization environments comprise groups of processes and/or resources (e.g., memory, CPU, disk, etc.) that are isolated from the host computer and other containers. Such containers directly interface with the kernel of the host operating system without reliance on a hypervisor layer. Many applications can be implemented as containerized applications (CAs). Any of the foregoing virtualized entities can be implemented in distributed virtualization systems to facilitate execution of one or more workloads. For example, a VM might be created to operate as an SQL server, while another VM might be created to support a virtual desktop infrastructure (VDI). As yet another example, any application code base might be implemented as a container in a distributed virtualization system.

The use of such virtualized entities in distributed virtualization systems to improve the use of system resources continues to increase. Some clusters might be populated with hundreds of nodes (or more) that support several thousands (or more) autonomous virtualized entities (e.g., VMs, containers, etc.) that perform a broad range of workloads. As such, the topology and/or resource usage activity of the distributed system can be highly dynamic. Users (e.g., administrators) of such large scale, highly dynamic distributed systems desire capabilities (e.g., management tools) that facilitate analyzing and/or managing the distributed system resources to satisfy not only the current but also the upcoming and/or predicted demands for resources. For example, the administrators might be able to forecast some number of new employee VDI desktops that are to be hosted on an existing cluster on a particular date when, for example, a merger or other acquisition becomes effective.

Unfortunately, legacy techniques for managing computing cluster resources in distributed virtualization systems fail to account for the dynamic workload characteristics that are present in hyperconverged systems. Legacy techniques naively implement resource planning based on measurements pertaining to the underlying resources in isolation (e.g., CPU, memory, etc.), rather than by considering how a particular workload or set of workloads might be addressed by newly deployed hardware configurations of cluster components.

Legacy techniques, for example, might merely determine a peak resource usage expected for each of a collection of resources over a certain planning time horizon to indicate resource increases that can satisfy the peak usage. However, these techniques do not account for the impact of any user-specified workload changes over the planning time horizon. Moreover, merely assessing the peak resource usage in a given planning time horizon can result in an inefficient use of resources, particularly as planning time horizons increase. For example, the foregoing techniques might cause an administrator to immediately deploy ten additional nodes to satisfy the peak resource usage over the next 12 months, but the demand for such resources might not actually occur until the tenth month. In this case, the additional nodes might be idle or underused for 10 months.

Still further, although legacy techniques might consider resource demand characteristics (e.g., demand for additional storage capacity), legacy techniques fail to account for applicability (e.g., node configuration, compatibilities, etc.) as pertains to nodes of a hyperconverged cluster. Moreover, legacy techniques for managing resources in distributed virtualization systems fail to provide sufficient interactivity with or by a system administrator or other user who wants to perform resource planning. More specifically, legacy techniques do not provide sufficient feedback to the administrator that accounts for system impacts of predicted "What-If" workload changes over a long-range planning time horizon.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1A1 and FIG. 1A2 present workload planning techniques as implemented in systems for long-range distributed resource planning using workload modeling, according to an embodiment.

FIG. 2 depicts a distributed virtualization environment in which embodiments of the present disclosure can operate.

FIG. 5A1, FIG. 5A2, FIG. 5B1, FIG. 5B2, FIG. 5C1, FIG. 5C2, FIG. 5D, FIG. 5E1, FIG. 5E2, and FIG. 5E3 present workload scenario planning interactions as facilitated by systems that implement long-range distributed resource planning, according to some embodiments.

DETAILED DESCRIPTION

Figure 1B:
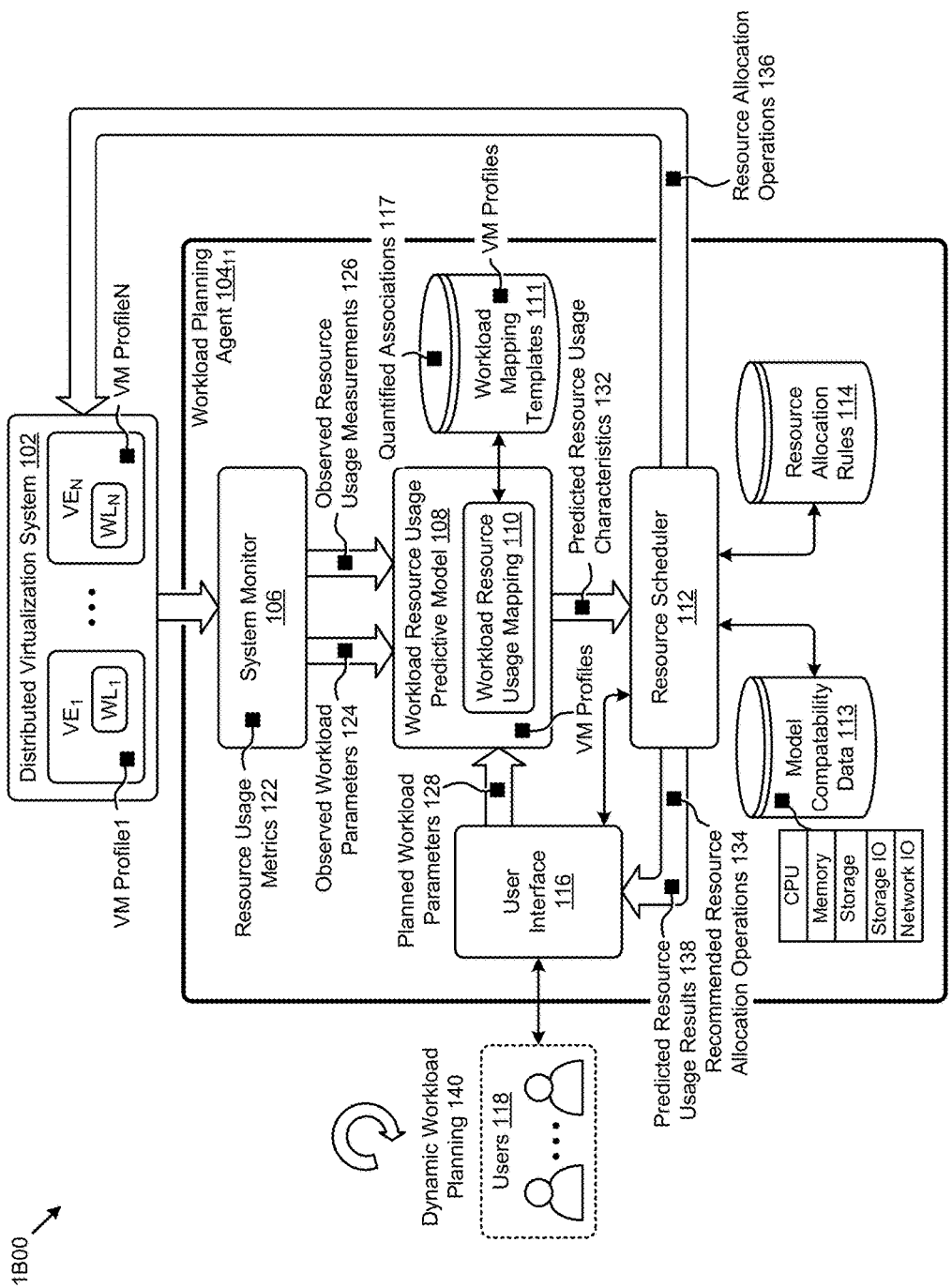
FIG. 1B depicts a selection of techniques used for long-range distributed resource planning using workload modeling, according to some embodiments.

Embodiments in accordance with the present disclosure address problems attendant to accounting for dynamic workload characteristics when planning for deployment of resources over future (e.g., long-range) time horizons. Some embodiments are directed to approaches for implementing a workload resource usage predictive model to map workload parameters to resource usage metrics to facilitate time-based resource planning in a distributed virtualization system. The accompanying figures and discussions herein present example environments, systems, methods, and computer program products for long-range distributed resource planning using workload modeling.

Overview

Disclosed herein are techniques for implementing a workload resource usage predictive model to map workload parameters to resource usage metrics to facilitate time-based, long-range resource planning in a distributed virtualization system. In certain embodiments, the workload resource usage predictive model is generated based on observed resource usage measurements associated with certain workloads. Certain planned workload specifications describing a set of planned workloads are consumed are captured by the workload resource usage predictive model to produce a set of predicted resource usage characteristics. The predicted resource usage characteristics are used in several contexts to determine various resource allocation operations to facilitate resource planning in the distributed virtualization system.

In some embodiments, the workload descriptions and the predictive model are used during user interaction with the system. In other situations, workload descriptions and the predictive model are employed to autonomously generate hardware resource deployment recommendations and/or to autonomously initiate resource planning actions such as placing an order for predictably needed computing infrastructure.

In some embodiments, the planned workload specifications, the predicted resource usage characteristics, or recommended resource satisfaction operations can be ephemeral—existing only during consideration of recommendations that arise from processing "What-If" scenarios. In certain embodiments, planned workload parameters that pertain to or quantify planned workload specifications are applied to the workload resource usage predictive model so as to predict demanded resources. Hardware recommendations that satisfy the demand can be adopted by a user (e.g., administrator) by interacting with a user interface. In some embodiments, certain other data, such as resource allocation rules, can be used to determine the hardware recommendations. In one or more embodiments, the hardware recommendations, possibly including specification of particular hardware model types, and deployment dates can be automatically scheduled and/or ordered by the system. A system administrator might take action on any one or more recommendations. For example, a system administrator or other personnel might take steps to purchase hardware that is configured to satisfy the planned workloads.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A1 presents a workload planning technique 1A100 as implemented in systems for long-range distributed resource planning using workload modeling of a hyperconverged cluster. As an option, one or more variations of workload planning technique 1A100 or any aspect thereof may be implemented in the context of the architecture and functionality of the embodiments described herein. The workload planning technique 1A100 or any aspect thereof may be implemented in any environment.

The workload planning technique makes recommendations that include recommendations to move all or parts of a workload to a particular computing platform model type. Making the determinations as to the nature and configuration of the computing platform type relies in part on use of a predictive model that correlates observations and/or measurements (e.g., stimulus and response) that are captured by system monitoring facilities. As shown, stimulus (e.g., derived from workload1 174 or from workload2 176) are captured by system monitors (e.g., cluster1 system monitor 172 and cluster2 system monitor 173). The observations and/or measurements are received by a workload planning agent, which in turn consults or is composed of a platform type specification matrix and an instance of the aforementioned predictive model.

The workload planning agent shown in FIG. 1A1 is able to capture (step 181) workload stimulus (e.g., workload1 stimulus and workload2 stimulus) and system performance over two or more different workloads (e.g., cluster1 response from workload1, cluster2 response from workload2). The workload planning agent can compare the captured behaviors to determine which workloads or system characteristics dominate performance limits or resource demands (step 183). Based on the determined system characteristics (e.g., performance limits or resource demands) the workload planning agent can identify and recommend a suitable computing platform that satisfies the observed or predicted resource demands. Further, based on the determined system characteristics or trends thereto, the workload planning agent can identify and recommend a suitable computing platform that satisfies the demands of the trends. The recommendations made may include a different platform configuration (e.g., type $T_2$, type $T_3$, etc.) for each different workload (step 185).

As shown, there are two different workload (workload1 174 and workload2 176), each of which are running on separate instances of the same computing platform type (computing platform of type T1 127 and another computing platform of type T1 127), each of which is identically configured, as shown with respect to 4 CPUs, 32 GB of semiconductor memory, and 6 GB of solid state storage devices (SSD).

By applying the herein-disclosed techniques, different recommendations are emitted based on workload characteristics. Specifically, User1 receives a computing platform model type $T_2$ recommendation 177 and User2 receives computing platform model type $T_3$ recommendation 178 even though their underlying computing platform over which the measurements are made are identical.

The foregoing is merely one example showing two workloads, however a user can predict additional workloads for consideration by the workload planning agent, thus facilitating long-range distributed resource planning.

Figure 2:
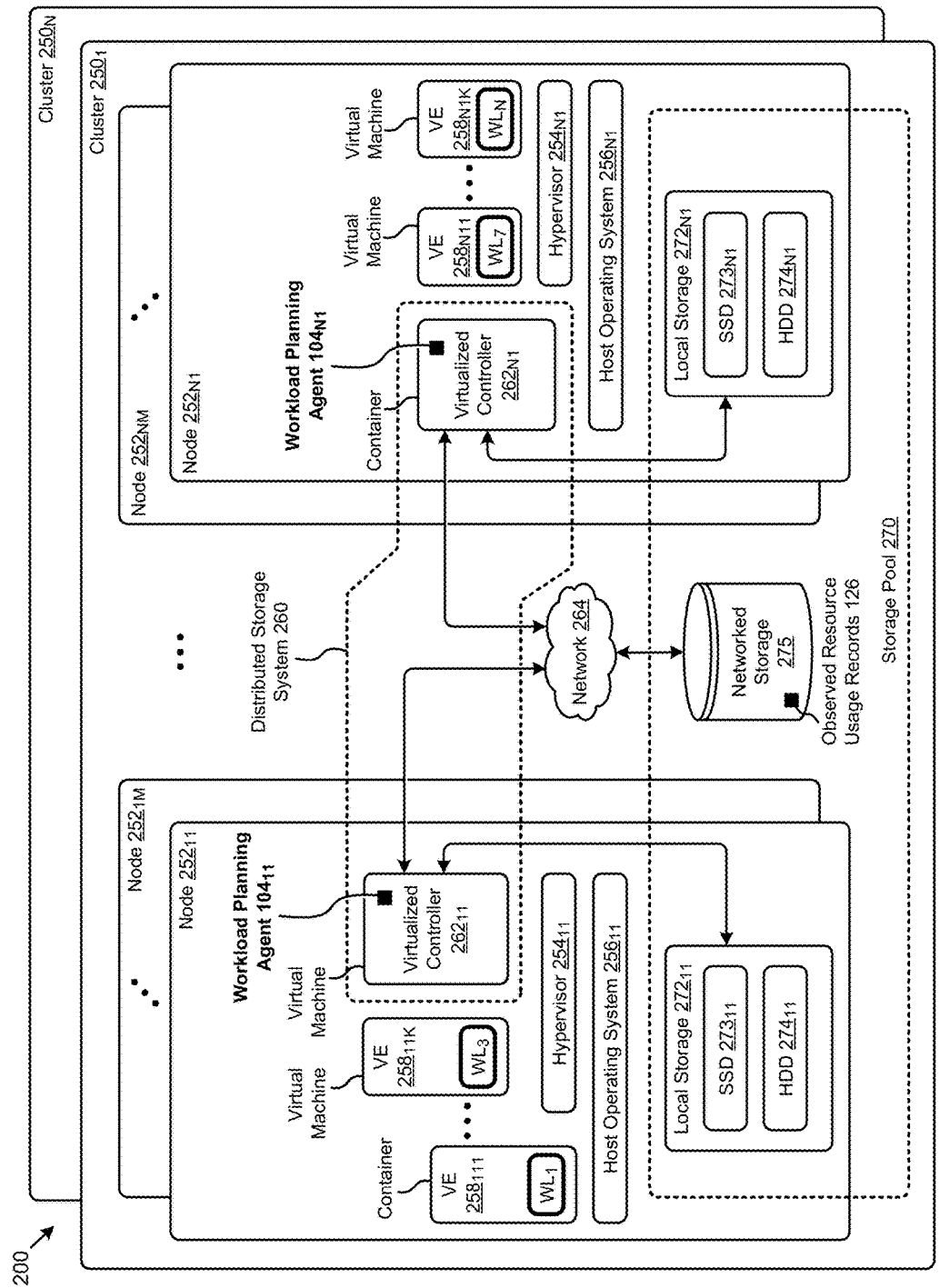

FIG. 1A2 presents a workload planning technique 1A200 as implemented in systems for long-range distributed resource planning using workload modeling. As an option, one or more variations of workload planning technique 1A200 or any aspect thereof may be implemented in the context of the architecture and functionality of the embodiments described herein. The workload planning technique 1A200 or any aspect thereof may be implemented in any environment.

The workload planning technique 1A200 presents one embodiment of certain steps for facilitating long-range distributed resource planning in a distributed virtualization system using workload modeling, according to the herein disclosed techniques. Specifically, the workload planning technique 1A200 can commence with receiving a set of observed resource usage measurements (step 152). The observed resource usage measurements are data records collected, for example, by a system monitor in the distributed virtualization system. The measurements and interpretations thereof serve to describe a level of usage pertaining to certain resource usage metrics such as CPU usage, memory usage, storage usage, and/or any other metrics. The observed resource usage measurements (step 154) are often organized and/or stored in key-value pairs, where the key is the resource usage metric and the value is the level of usage for that metric.

For example, a measurement for CPU usage might have a key of "cpu" and a value of "3.5 GHz". A set of observed workload parameters can also be received, possibly from a previously stored set of key-value pairs that are organized into resource usage records 105. A set of resource usage records 105 can be organized as workload mapping templates 111, which are used to match a particular named workload or otherwise defined workload into a set of resource usage values. The resource usage records 105 can be used singly (e.g., to map a named workload to a set of resource usage observations) or in combination (e.g., to map a group of workloads to an amalgamated set of resource usage values), and can be used to map from a workload specification to a set of resource usage demands.

The resource usage records 105 can be based on a pre-populated configuration (e.g., default values) or can be derived from observed workload parameters that are empirically collected, for example, by a system monitor in the distributed virtualization system. As examples, a workload might be associated with operations pertaining to an SQL server, a virtual server, a virtual machine, a container, a virtual desktop infrastructure (VDI), and/or other sets of applications and/or operations. In some cases, VNI profiles (e.g., VNI profile1, VNI profileN) can be captured or otherwise associated with a particular VNI (e.g., associated to a workload, or associated to a set of resources demands or associated with other parameters). The profiles themselves can include any characteristics of a VM that is known in advance of invoking such a VM, and/or profiles can include any historical and/or current runtime observations or parameters, including static or dynamic workload parameters.

The characteristics or parameters in the profiles, possibly including any observed workload parameters are often organized and/or stored in key-value pairs, where the key is the type of parameter and the value pertains to a particular workload. Strictly as one example, a workload parameter for an SQL server workload might have a key of "paramN" or "databaseType", and a value of "OLTP" (online transaction processing).

Referring again to the aforementioned virtual servers, virtual machines, and containers, any of the foregoing can be implemented as virtualized entities that serve to virtualize any aspects of a computing system. As used in this and other embodiments, virtualized entities can be virtual machines running in conjunction with virtualization services provided by a hypervisor. In many embodiments, virtualized entities are implemented as containers (e.g., Docker containers) that include virtualization or abstraction functions such as virtualizing or abstracting underlying storage facilities.

The virtualized entities can be subjected to in situ observations and/or measurements, which in turn can be used in the formation of a predictive model. The herein disclosed techniques can be used to generate a workload resource usage predictive model by mapping the observed workload parameters from active workloads to the observed resource usage associated with those workloads (step 156). The workload resource usage predictive model is a collection of mathematical techniques (e.g., algorithms) that facilitate predicting a set of outputs (e.g., outcomes, responses) based on a set of inputs (e.g., workload stimuli).

For example, the workload resource usage predictive model might consume workload parameters as inputs to predict a set of workload resource usage predictions as outputs. In some cases, the techniques implemented by the model might comprise a set of equations having coefficients that relate one or more of the input variables to one or more of the output variables. In these cases, the equations and coefficients can be determined by a training process. In other cases, the model can map discrete combinations of inputs (e.g., workload parameters) to respective combinations of outputs (e.g., resource usage metrics). The workload resource usage predictive model can be time-based when a unit of time is one of its input and/or output variables. For example, one embodiment of a time-based workload resource usage predictive model implemented by the herein disclosed techniques can predict a resource usage metric value for a given moment in time over a sequence of moments in time based at least in part on a set of workload parameters that also vary over time. Further details describing one embodiment of a workload resource usage predictive model are disclosed as pertaining to FIG. 3.

Referring again to the workload planning technique 1A200, a set of steps implement workload forecasting and corresponding resource demands as pertains to infrastructure planning (e.g., dynamic workload planning 140). Specifically, a set of planned workload parameters are received (step 158). The set of planned workload parameters derive from user specifications or from an automated infrastructure ordering agent. Strictly as an example, an administrator or other user might know or be able to predict that an additional 10 employees are soon coming "online" in the company and will need computing resources. Or, as another example, an automated infrastructure ordering agent might automatically schedule infrastructure deployments that follow a predetermined pattern (e.g., deploy and additional 2 T of storage every 30 days).

Using the calculations and displays pertaining to the dynamic workload planning 140, the user can perform long-range planning using a "What-If" approach in a loop. More specifically, given the planned workload parameters (e.g., as entered by a user), the aforementioned workload resource usage predictive model can be used to determine a set of predicted resource usage characteristics that correspond to the "What-If" scenarios. The planned workload parameters are sets of parameters that describe one or more workloads that are planned to be executed at a planned deployment date. Such planned workload parameters might include parameters that characterize storage capacity and/or other configurations of the distributed virtualization system for the enterprise.

The predicted resource usage characteristics are data records determined by the workload resource usage predictive model to describe estimated levels of resource usage for a given planned workload. The predicted resource usage characteristics can be organized and/or stored in key-value pairs, where the key is the resource usage metric and the value is the estimated level of usage for that metric. For example, a predicted estimate for CPU usage might have a key of "cpu" and a value of "20 GHz". In some cases, the predicted resource usage characteristics might indicate a breach of certain capacity and/or policy thresholds associated with a particular distributed system.

The resource usage predictive model can be used in combination with resource usage records 105 and workload mapping templates (at step 162) to map planned workload parameters to resource usage characteristics. As an example, if the additional 10 employees are coming online in the company, thus presenting a need for 10 VDI desktop workloads, and if in turn the workload mapping templates map a single VDI workload to an "average of 1.2 GHz of CPU load" and "100 GBytes of storage quota", then the predictable resource usage characteristics might include a needed 12 GHZ of CPU availability and a needed 1000 GB of storage capacity.

The quantified resource usage characteristics can be mapped (at step 163) to a particular cluster or node or unit model identifier (e.g., NX7500) and/or a particular number of such instances so as to meet the predicted computing needs. As shown, a dataset with model compatibility data 113, including model type specifications 109, can be consulted when mapping predicted resource usage characteristics to compatible system model types.

In many cases, various constraints, computing platform model type specifications, and resource allocation rules are considered (at step 165) when making a determination of which particular cluster or node or unit model identifier, and how many corresponding instances are to be recommended or specified. Moreover, when specifying any combination of clusters or nodes or number of corresponding instances, resource allocation rules 114 are applied to achieve comparability in the specified mix. Strictly as an example, it might be possible to satisfy (for example) a predicted demand for 5 T of storage by deploying a first unit with 4 T of storage capacity and a second unit with 1 T of storage capacity, however one or more resource allocation rules might instead require (for example) two units, each with (for example) 2.5 T of storage each. The resource allocation rules can accept inputs and parameters from any source.

TABLE 1

Resource Allocation Rules

| Rule or Constraint Handle | Meaning |
|---|---|
| Balance with respect to existing hardware | When recommending new hardware, balance the configuration of the new resources with respect to the existing hardware |
| Balance between new nodes | Balance individual nodes when recommending multiple instances of new hardware |
| Observe RF configuration | When selecting new hardware, observe any replication factor when determining storage capacity configuration |
| Observe CF configuration | When selecting new hardware, observe any compression factor when determining storage capacity configuration |
| Observe balance threshold | When perfect balancing cannot be achieved, use a threshold and a best-fit algorithm |

Further to the foregoing examples of resource allocation rules, if the cluster or site implements a data protection regime with a replication factor of 2, then application of the one or more resource allocation rules might require (for example) four units, each with (for example) 2.5 T of storage each, where two of the units satisfy the demand for the raw 5 T of storage, and the other two of the units satisfy the demands deriving from the data protection replication factor of 2. Further details of use of a replication factor is shown and discussed as pertains to FIG. 5A1.

Further details regarding general approaches to data protection using a replication factor are described in U.S. application Ser. No. 15/230,147 titled, "IMPLEMENTING AVAILABILITY DOMAIN AWARE REPLICATION POLICIES" filed on Aug. 5, 2016, which is hereby incorporated by reference in its entirety.

Applying compatibility constraints 115 and resource allocation rules 114 to the predicted resource usage indications serve to generate recommended resource allocation actions. Resource allocation actions are actions (e.g., recommended actions or adopted actions) that can be proposed/recommended and/or accepted/adopted by operation of components of the system. For example, actions that can be proposed can include specification of additional hardware to be deployed on some particular date. As another example, actions that can be adopted by operation of components of the system can include modeling the effect of bringing in the specified additional hardware to service an existing and/or planned workload or combination thereof. The compatibility constraints are used to determine a Boolean "Yes, compatible", or "No, not compatible" test. In some cases compatibility constraints are used to determine a named threshold and/or applicability of such a named threshold when assessing compatibility.

The resource allocation actions can be considered with respect to a confidence factor (e.g., a statistical confidence interval as calculated by the predictive model) and/or resource allocation actions might be scored and/or filtered out on the basis of an objective function (e.g., to achieve a minimized costs or a maximized predicted utilization factor). Strictly as one example, in a scenario where a large amount of additional storage capacity is forecasted, but only a small amount of additional CPU cycle availability is forecasted, a single "storage-only" node might be specified, which in turn might correspond to a lower cost as compared to a specification of multiple "storage+CPU" nodes.

Low-scoring resource allocation actions might not be recommended at all. In some cases a resource allocation action might be taken immediately, or might be taken after a wait state (as shown). In some cases the wait state is inherent or implied or inferred from the nature and description of the resource allocation action itself. For example, a resource allocation action might indicate a future deployment date for a particular configuration of hardware. The wait state that might be introduced covers the timeframe from when the known or predicted need for a particular configuration of hardware is identified and the time when the particular configuration of hardware can be deployed in fact.

As further examples, resource allocation operations might specify an immediate increase in compute resource capacity at one node on an as-soon-as-possible basis, while certain additional amounts of storage resource capacity might be specified to be deployed on a future date. In some cases, a resource allocation operation can comprise a set of human-readable information that a user (e.g., administrator) can use to perform the resource allocation (e.g., ordering of the needed computing machinery). In other cases, a resource allocation operation can comprise a set of messages and/or commands that can be executed by certain agents and/or components of the distributed virtualization system to perform automated resource allocation. In any case, any number of the recommended resource allocation operations can be displayed to reflect the deployment time associated with each operation. Any one or more effects of accepting or otherwise acting on resource deployment recommendations for computing system models to deploy (step 165) can be displayed in a user interface screen (step 166).

The workload planning technique 1A200 and the herein disclosed techniques address the problems attendant to accounting for dynamic workload characteristics when planning resource deployments in distributed virtualization systems. Specifically, workload planning technique 1A200 accounts for the impact of time-based workload changes by determining predicted resource usage characteristics associated with planned workloads into the future. Further, the herein disclosed techniques account for the time-based dependencies of the foregoing workload changes to maximize the efficiency of any related resource allocation operations. For example, deployment of an additional 10 nodes to satisfy the predicted resource usage of a planned workload increase on a given planned workload deployment date that corresponds to a hardware deployment date that is selected so as to maximize the use of the additional nodes from that date forward, yet without suffering low resource utilization due to a too early deployment of the additional 10 nodes.

One implementation of various system components and/or interactions for facilitating the foregoing workload planning technique and/or other herein disclosed techniques is shown and described as pertaining to FIG. 1B.

FIG. 1B depicts a selection of techniques 1B00 used for long-range distributed resource planning using workload modeling. As an option, one or more variations of techniques 1B00 or any aspect thereof may be implemented in the context of the architecture and functionality of the embodiments described herein. The techniques 1B00 or any aspect thereof may be implemented in any environment.

The embodiment shown in FIG. 1B comprises a workload planning agent $104_{11}$ that facilitates workload modeling to perform long-range distributed resource planning for a distributed virtualization system 102 according to the herein disclosed techniques. Specifically, and as shown, workload planning agent $104_{11}$ comprises a system monitor 106 to collect a set of observed resource usage measurements 126 pertaining to various metrics (e.g., resource usage metrics 122) used to characterize various aspects of the usage of resources in the distributed virtualization system 102. System monitor 106 can further collect a set of observed workload parameters 124 associated with various currently active and observable workloads (e.g., $WL_1, \ldots, WL_N$) operating at certain virtualized entities (e.g., $VE_1, \ldots, VE_X$, respectively) at distributed virtualization system 102. A workload resource usage predictive model 108 can be generated using the observed workload parameters 124 and the observed resource usage measurements 126 according to the herein disclosed techniques.

In some embodiments, workload resource usage predictive model 108 can comprise a workload resource usage mapping 110 to associate certain workloads with a respective set of predicted resource usage characteristics. Such a mapping is facilitated by existence of the shown workload mapping templates 111. The workload mapping templates 111 can be manually populated (e.g., as default values) or can be populated during system operation (e.g., by a system monitor). Using a default value or empirically-determined values, a workload (e.g., a named workload such as a VDI workload) can be associated with observed resource usage characteristics. Over time, a corpus of associations between a workload or workload type and its resource usage demands will become statistically significant. Using statistical analysis, an association between a particular workload or a particular workload type and its respective resource usage demands can be quantified and stored in the form of quantified associations 117 (e.g., as a statistical confidence interval).

Using such associations, a workload resource usage predictive model 108 can map a set of planned workload parameters 128 to a set of predicted resource usage characteristics 132. As shown, the planned workload parameters 128 might be received from a user interface 116 accessed by one or more users (e.g., users 118). As an example, such users (e.g., system administrators) might use the user interface 116 to analyze various long-term planning scenarios comprising various workload changes over time, where the workload changes are described in the planned workload parameters 128 exposed to the workload resource usage predictive model 108. The resulting time-based predicted resource usage characteristics can then be analyzed by a resource scheduler 112 (e.g., at the workload planning agent $104_{11}$) in conjunction with the shown model compatibility data 113 and the resource allocation rules 114 to generate one or more recommended resource allocation operations 134. The recommended resource allocation operations 134 might be generated to remediate a predicted breach of certain capacity and/or policy thresholds based at least in part on the predicted resource usage characteristics 132.

In certain embodiments, recommended resource allocation operations 134 can be further based at least in part on the contents and semantics of the model compatibility data 113. For example, model compatibility data might include model-by-model parameters that pertain to respective CPU capabilities (e.g., GHz), installed memory, storage capacity, shared storage I/O (input/output or IO) capability, shared storage pool usage, and/or network I/O capability. As shown, the model compatibility data 113 includes computing platform model type specifications. In addition to various characteristics of CPUs (clock rate, etc.), memory (e.g., speed, capacity, form factor, etc.) and so on, the computing platform model type specifications include details pertaining to characteristics of models that are relevant to hyperconverged storage systems. For example, computing platform model type specifications can include details pertaining to node-local storage input/output operations per second (IOPS) as well as details pertaining to networked storage IOPS. Further, computing platform model type specifications can include details pertaining to storage I/O latency and/or details pertaining to matching rates between node-local storage latencies as well as details pertaining to networked storage latencies.

In certain embodiments, recommended resource allocation operations 134 can be further based at least in part on a set or resource allocation rules 114. For example, a resource allocation rule can be applied to constrain the scope of recommended resource allocation operations. Specifically, a resource allocation rule might specify a certain node configuration that can be deployed to a given cluster to impact the number of nodes to be deployed to satisfy a predicted resource usage increase. In another scenario pertaining to network I/O capability, a selection of two nodes might be purposely matched to each have one 10 GBps network card rather than some equivalent number of cards having multiple 1 GBps network ports.

A set of predicted resource usage results 138 and/or the recommended resource allocation operations 134, if any, can be presented in the user interface 116 for analysis by the users 118. For example, a user might examine the predicted resource usage results to determine which of the recommended resource allocation operations to decline or accept for deployment. In some cases, resource scheduler 112 might automatically accept one or more of the recommended resource allocation operations for deployment. Users 118 can continually modify the workloads for a given planning scenario, view predicted resource usage results, accept and/or decline recommended resource allocation operations, and/or otherwise interact with user interface 116 to perform a dynamic workload planning 140 facilitated by the herein disclosed techniques.

The accepted (e.g., selected) recommended resource allocation operations can comprise a set of resource allocation operations 136 that are executed at the distributed virtualization system 102. For example, according to the herein disclosed techniques, resource allocation operations 136 can comprise a time-series of operations to be executed at specified moments in time at the distributed system.

The components, data flows, and data structures shown in FIG. 1B presents merely one partitioning and associated data manipulation approach. The specific example shown is purely exemplary, and other subsystems and/or partitioning are reasonable. One embodiment of an environment depicting such systems, subsystems, and/or partitionings is shown and described as pertaining to FIG. 2.

FIG. 2 depicts a distributed virtualization environment 200 in which embodiments of the present disclosure can operate. As an option, one or more variations of distributed virtualization environment 200 or any aspect thereof may be implemented in the context of the architecture and functionality of the embodiments described herein. The distributed virtualization environment 200 or any aspect thereof may be implemented in any environment.

The distributed virtualization environment 200 shows various components associated with one instance of a distributed virtualization system (e.g., hyperconverged distributed system) comprising a distributed storage system 260 that can be used to implement the herein disclosed techniques. Specifically, the distributed virtualization environment 200 comprises multiple clusters (e.g., cluster $250_1, \ldots,$ cluster $250_N$) comprising multiple nodes (e.g., node $252_{11}, \ldots,$ node $252_{1M}$, node $252_{N1}, \ldots,$ node $252_{NM}$) that have multiple tiers of storage in a storage pool 270. For example, each node can be associated with one server, multiple servers, or portions of a server. The nodes can be associated (e.g., logically and/or physically) with the clusters. As shown, the multiple tiers of storage include storage that is accessible through a network 264, such as a networked storage 275 (e.g., a storage area network or SAN, network attached storage or NAS, etc.). The multiple tiers of storage further include instances of local storage (e.g., local storage $272_{11}$, . . . , local storage $272_{N1}$). For example, the local storage can be within or directly attached to a server and/or appliance associated with the nodes. Such local storage can include solid state drives (SSD $273_{11}$, . . . , SSD $273_{N1}$), hard disk drives (HDD $274_{11}$, . . . , HDD $274_{N1}$), and/or other storage devices.

As shown, the nodes in distributed virtualization environment 200 can implement one or more user virtualized entities (e.g., VE $258_{111}$, . . . , VE $258_{11K}$, . . . ; VE $258_{N11}$, . . . , VE $258_{N1K}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $256_{11}$, . . . , host operating system $256_{N1}$), while the VMs run multiple applications on various respective guest operating systems. Such flexibility can be facilitated at least in part by a hypervisor (e.g., hypervisor $254_{11}$, . . . , hypervisor $254_{N1}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization or container virtualization environment. The containers comprise groups of processes and/or resources (e.g., memory, CPU, disk, etc.) that are isolated from the node host computer and other containers. Such containers directly interface with the kernel of the host operating system (e.g., host operating system $256_{11}$, . . . , host operating system $256_{N1}$) with, in most cases, no hypervisor layer. This lightweight implementation can facilitate efficient distribution of certain software components such as applications or services (e.g., microservices). As shown, distributed virtualization environment 200 can implement both a hypervisor-assisted virtualization environment and a container virtualization environment for various purposes.

Distributed virtualization environment 200 also comprises at least one instance of a virtualized controller to facilitate access to storage pool 270 by the VMs and/or containers. Multiple instances of such virtualized controllers can coordinate within a cluster to form the distributed storage system 260 which can, among other operations, manage the storage pool 270. This architecture further facilitates efficient scaling of the distributed virtualization system. The foregoing virtualized controllers can be implemented in distributed virtualization environment 200 using various techniques. Specifically, an instance of a virtual machine at a given node can be used as a virtualized controller in a hypervisor-assisted virtualization environment to manage storage and I/O (input/output or IO) activities. In this case, for example, the virtualize entities at node $252_{11}$ can interface with a controller virtual machine (e.g., virtualized controller $262_{11}$) through hypervisor $254_{11}$ to access the storage pool 270. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 260.

For example, a hypervisor at one node in the distributed storage system 260 might correspond to VMware ESXi software, and a hypervisor at another node in the distributed storage system 260 might correspond to Nutanix AHV software. As another virtualized controller implementation example, containers (e.g., Docker containers) can be used to implement a virtualized controller (e.g., virtualized controller $262_{N1}$) in an operating system virtualization environment at a given node. In this case, for example, the virtualized entities at node $252_{N1}$ can access the storage pool 270 by interfacing with a controller container (e.g., virtualized controller $262_{N1}$) through hypervisor $254_{N1}$ and/or the kernel of host operating system $256_{N1}$.

In certain embodiments, one or more instances of a workload planning agent can be implemented in the distributed storage system 260 to facilitate the herein disclosed techniques. Specifically, workload planning agent $104_{11}$ can be implemented in virtualized controller $262_{11}$, and workload planning agent $104_{N1}$ can be implemented in virtualized controller $262_{N1}$. Such instances of the workload planning agent can be implemented in any node in any cluster. In certain embodiments, the workload planning agents can perform various operations pertaining to measuring and capturing characteristics of the workloads (e.g., $WL_1$, . . . , $WL_3$, . . . , $WL_7$, . . . , $WL_N$).

As an example, the workload planning agents can individually or collectively take measurements pertaining to any measurable aspect of the node, its CPU usage, its memory usage, storage IO characteristics, etc. Any of the workload planning agents can capture measurements and then store the captured measurements in the storage pool 270, which in turn makes any of the measurements accessible to any other workload planning agent. Due in part to the juxtaposition of the virtualized controllers in the distributed storage system 260, and more specifically due to the aspect that any virtualized controller processes storage IO not only from its respective node, but also storage IO to/from any storage device in the storage pool, the virtualized controllers can capture and store storage-related properties that were heretofore unable to be measured. Storage-related properties pertaining to a particular workload can be captured by the virtualized controllers, and can then be used in conjunction with a rich set of workload mapping templates to characterize resource demands from a particular workload down to accurate and fine-grained levels of detail.

As another example pertaining to the function of workload planning agents, the workload planning agents can use or implement a workload resource usage predictive model to facilitate time-based, long-range distributed resource planning for the resource subsystem. Specifically, the workload planning agents might generate a set of time-based resource allocation operations to deploy to the distributed system at certain moments in time. As can be observed, the resource allocations associated with such resource allocation operations can occur within a node, between nodes, between clusters, and/or between any resource subsystems accessible by the workload planning agents.

As earlier described, such dynamic resource allocations produced by the workload planning agent according to the herein disclosed techniques can be facilitated at least in part by one or more workload resource usage predictive models.

Figure 3:
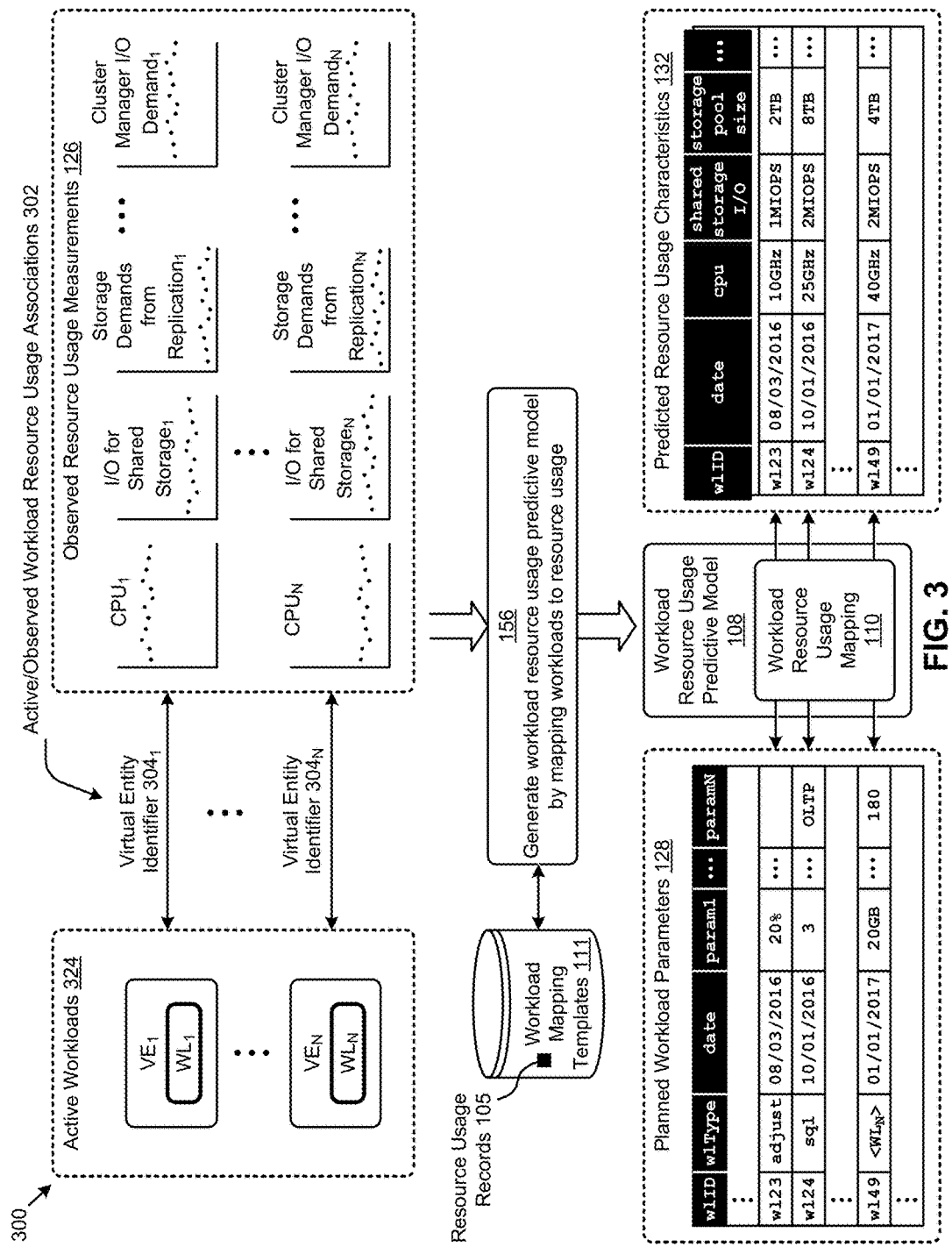
FIG. 3 depicts a workload modeling technique as implemented in systems for long-range distributed resource planning using workload modeling, according to an embodiment.

Further details related to such workload models are shown and described as pertaining to FIG. 3.

FIG. 3 depicts a workload modeling technique 300 as implemented in systems for long-range distributed resource planning using workload modeling. As an option, one or more variations of workload modeling technique 300 or any aspect thereof may be implemented in the context of the architecture and functionality of the embodiments described herein. The workload modeling technique 300 or any aspect thereof may be implemented in any environment.

The embodiment shown in FIG. 3 is merely one example of a technique for generating a workload resource usage predictive model for facilitating long-range distributed resource planning according to the herein disclosed techniques. Specifically, and as shown, workload parameters describing a set of active workloads 324 can be mapped to observed resource usage measurements 126 to generate a workload resource usage predictive model 108 (step 156). The resulting instance of workload resource usage mapping 110 comprising workload resource usage predictive model 108 can facilitate mapping various planned workloads described by respective sets of planned workload parameters 128 to respective sets of predicted resource usage characteristics 132.

More specifically, in certain embodiments, a workload $WL_1$ operating at a virtualized entity $VE_1$ might be associated (e.g., using one or more of the resource usage records 105) with a respective set of observed resource usage measurements 126 (e.g., $CPU_1$, $memory_1$, $storage_1$, etc.) based at least in part on a virtual entity identifier $304_1$ that uniquely identifies $VE_1$. For example, the virtual entity identifier $304_1$ can be included in the workload parameters describing $WL_1$ and can be associated with certain observed resource usage measurements collected by, for example, a process that monitors the hyperconverged cluster. Strictly as additional examples pertaining to a hyperconverged cluster, a workload $WL_N$ operating at a virtualized entity $VE_N$ might be associated with a respective set of observed hyperconverged cluster resource usage measurements (e.g., CPU demand, I/O for shared storage, storage demand from replication factor configurations, cluster manager I/O demand, etc.). Any of the foregoing observed hyperconverged cluster resource usage measurements can be associated with a particular virtual entity identifier $304_N$ that uniquely identifies a processing entity (e.g., $VE_1$, $VE_N$, as shown). Other techniques for determining observed workload resource usage associations 302 between observed hyperconverged cluster resource usage measurements and processing entities are possible.

As earlier mentioned, the associations between the observed resource usage measurements 126 and the active workloads 324 can be used to generate the workload resource usage mapping 110 comprising the workload resource usage predictive model 108 (step 156). The resulting workload resource usage predictive model can then be used to map various instances of planned workload parameters 128 to respective instances of predicted resource usage characteristics 132.

Specifically, for example, the planned workload parameters 128 might include a set of workload parameters identified by a unique workload identifier (e.g., w1ID=w124) that describe a SQL server workload (e.g., w1Type=sq1) with a planned workload deployment date of Oct. 1, 2016 (e.g., date=10/01/2016) and having three OLTP databases (e.g., param1=3 and paramN=OLTP). As another example, the planned workload parameters 128 might include a workload identifier that describes a group of virtual desktops that are planned for deployment on a future date. Other parameters associated with workloads are possible. According to the herein disclosed techniques, the planned workload identified by w124 can be mapped by the workload resource usage predictive model 108 to a set of the predicted resource usage characteristics 132 associated with planned workload w124. Specifically, strictly as one example, planned workload w124 is predicted to demand 25 GHz of cpu resources, 2 MIOPS of shared storage I/O resources, 2 TB of shared storage pool resources, as well as other resources. As further examples, planned workloads w123 and w149 are also mapped to a respective set of predicted resource characteristics identified by identifiers w123 and w149, respectively.

The workload resource usage predictive model 108 can facilitate dynamic long-range distributed resource planning by users of a given distributed virtualization system. One embodiment of a use model for that can be implemented by such users is shown and described as pertaining to FIG. 4.

Figure 4:
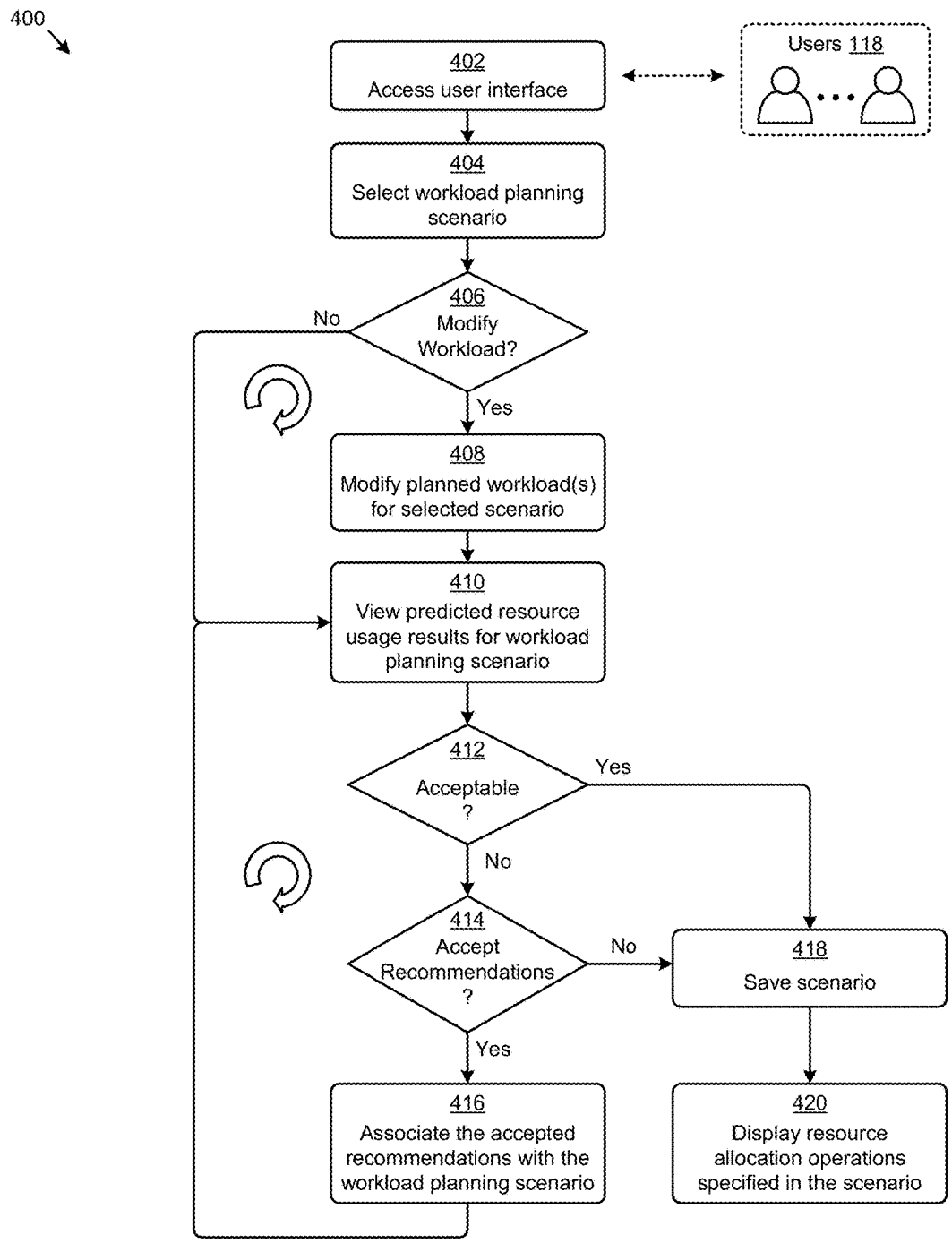
FIG. 4 depicts a workload planning use model facilitated by systems that implement long-range distributed resource planning, according to an embodiment.

FIG. 4 depicts a workload planning use model 400 facilitated by systems that implement long-range distributed resource planning. As an option, one or more variations of workload planning use model 400 or any aspect thereof may be implemented in the context of the architecture and functionality of the embodiments described herein. The workload planning use model 400 or any aspect thereof may be implemented in any environment.

The workload planning use model 400 presents one embodiment of certain steps for using the herein disclosed techniques to perform long-range distributed resource planning in a distributed virtualization system that accounts for time-based planned workload scenarios. Specifically, workload planning use model 400 can commence with accessing a user interface by, for example, a set of users 118 (step 402). In the user interface, a certain workload planning scenario can be selected for analysis (step 404). In some cases, the user might want to the modify one or more of the workloads associated with the workload planning scenario (see "Yes" path of decision 406). For example, existing workloads associated with the planning scenario can be modified (e.g., changed, removed, etc.) and/or new workloads can be added to the planning scenario. When the modifications to the planned workloads for the selected planning scenario are implemented (step 408), the predicted resource usage results for the workload planning scenario generated by the herein disclosed techniques can be viewed in the user interface (step 410). In some cases, the predicted resource usage results can be viewed without modifying any of the planned workloads (see "No" path of decision 406).

A user can analyze the viewed resource usage results to determine if the then-current resource allocations associated with the workload planning scenario are acceptable (decision 412). For example, in some cases, the resource allocation plan is sufficient for satisfying the predicted resource usage associated with the workload planning scenario. In these cases (see "Yes" path of decision 412), the scenario might be saved (e.g., if modifications were made) (step 418) and the resource allocation operations specified for the workload planning scenario can be displayed (step 420). In other cases, the predicted resource usage results may not be acceptable (see "No" path of decision 412). In such cases, one or more of the recommended resource allocation operations generated by the herein disclosed techniques can be accepted by the user (see "Yes" path of decision 414). The accepted recommended resource allocation operations can be selected (and optionally modified), and associated with the workload planning scenario (step 416). An updated view of the predicted resource usage results that accounts for deployment of the resource deployment recommendations can be presented for analysis in the user interface (step 410) and possible acceptance (decision 412).

In yet other cases, the recommended resource allocation operations generated by the herein disclosed techniques can be declined (see "No" path of decision 414). For example, other resource allocation operations different from the recommended resource allocation operations might be deployed to accommodate the planned workloads comprising the selected workload planning scenario.

Examples of various user interface views used to interact with systems implementing the herein disclosed techniques for long-range distributed resource planning using workload modeling are illustrated and described as follows.

FIG. 5A1, FIG. 5A2, FIG. 5B1, FIG. 5B2, FIG. 5C1, FIG. 5C2, FIG. 5D, FIG. 5E1, FIG. 5E2, and FIG. 5E3 present workload scenario planning interactions 500 as facilitated by systems that implement long-range distributed resource planning. As an option, one or more variations of workload scenario planning interactions 500 or any aspect thereof may be implemented in the context of the architecture and functionality of the embodiments described herein. The workload scenario planning interactions 500 or any aspect thereof may be implemented in any environment.

As shown in FIG. 5A1, a user might access a user interface to present a view $502_1$. Specifically, view $502_1$ might present a then-current view of the predicted resource usage of a workload planning scenario "my_scenario_1" associated with cluster "test cluster". As can be observed, the "runways" corresponding to various resource metrics (e.g., "CPU", "Memory", and "Storage") are "too short" at least as pertaining to the "Target" time window of "6 Months". For example, the "Overall Runway" is merely "32 days" as compared to the target date corresponding to 180 days hence. Operation of this set of workload scenario planning interactions 500 of FIG. 5A1 relies, at least in part, on underlying calculations, some of which are shown at the right in FIG. 1A2. As shown a user interface panel serves to display fields to capture user definable scenario parameters (step 552), which are normalized at step 554 to be used for workload mapping. The normalized inputs and workload mapping templates are used to map workload characteristics to resource demands. The workload parameters and/or the resource demands derived from the templates are used either singly or in combination with a predictive model to generate a further set of resource usage predictions (step 556). The predictions are displayed (at step 558) in a user interface such as given in view $502_1$. In some cases, and as shown, the user specified "Target" is superimposed onto the view (step 560) to offer a time-oriented perspective of the "Runway" vis-à-vis the "Target" planning horizon. As shown, the view $502_1$. includes a runway indication 590, a runway date indication 592 that pertains to a shortest one of a set of individual resource usage predictions (e.g., a CPU runway, a memory runway, a storage runway, etc.).

The user can view and/or change various values, including various values pertaining to the "Replication Factor" and/or the "Compression Factor" (as shown). The replication factor and/or the compression factor can be considered when applying resource allocation rules and/or when considering compatibility constraints 115 (e.g., pertaining to added hardware components that correspond to user-added or other workloads in a scenario). Using the cursor in view $502_1$, the user can click on a "New Workload" link to add a new planned workload to scenario "my_scenario_1". As shown in view $502_2$, a "Percentage" workload can be added that scales (step 553) an existing workload by "+20%" on "08/03/2016". In addition to the foregoing scaled workload, other workloads (e.g., SQL server, virtual server, virtual machine, virtual desktop infrastructure (VDI), etc.) can also be added (see FIG. 5C1, for example). When the workload parameters for the new workload are specified, the workload can be saved by clicking on "Save Workload". An "autosave" capability may be included so as to protect against user inattentiveness. The operations shown and discussed as pertaining to FIG. 5A1 are re-executed using the workload scaling parameters that were captured at step 552.

Aspects of the user interface as depicted in view $502_1$ and in view $502_2$ can be combined to form view $502_3$. Any number of planned future workloads can be added (step 564). Specifically, referring to FIG. 5B1, a view $502_3$ presents the predicted resource usage results responsive to adding the "Percentage" workload in view $502_2$ of FIG. 5A2. The "Overall Runway" is reduced from "32 days" to "21 days". Also shown in view $502_3$ are the predicted resource usage characteristics pertaining to the added "Percentage" workload. A CPU usage of "10 GHz", a memory usage of "20 GB", and a storage usage of "2 TB" are shown. The "Overall Runway" is too short vis-à-vis the user specified "Target". At step 561, processing is undertaken to calculate and display remediating recommendations. A user can accept the recommendations by clicking on a "Recommend" button to accept the recommendations. Recommendations are displayed (see FIG. 5B2).

As shown in the view $502_4$ of FIG. 5B2, the hardware recommendations are displayed as recommended hardware in as a configured model (e.g., model number "NX7500"). Calculations that are performed (at step 557) using the predictive model serve to produce predicted resource usage characteristics, which in turn are used to calculate hardware recommendations (step 566) that are to be deployed at a particular moment in time so as to remediate the limitations of the then-current "Hardware" (e.g., "Existing" hardware) to perform all of the planned workloads. A time-oriented set of recommendations (e.g., time-oriented sets of predicted resource demands 596) is displayed (step 568). The effect of applying the recommended resource allocation operations is to increase the "Overall Runway" from "21 days" to "318 days". As shown in the "Hardware" section of view $502_4$, the recommendations comprise deploying an "NX7500" appliance having "1" node on "08/02/2016". A hardware recommendation can comprise any one or more of, a model identifier 591, a number of nodes of that model, a date of deployment indication 594, a memory capacity 593, a storage capacity 595, and/or other characteristics of the hardware and/or the nature of its recommended deployment.

As further shown by the cursor in view $502_4$, the user can click on a "New Workload" link to add a new planned workload to the then-current scenario. The workload can be a named workload that corresponds to set of default or measured resource demands that are deemed or forecasted to be needed in service by a particular date. Specifically, referring to view $502_5$ in FIG. 5C1, an "SQL Server" workload can be added on a future date, namely "10/01/2016". A user can enter a user-specified workload 598 in an area of the user interface that serves as a workload parameter specification area 597. Within the workload parameter specification area various workload parameters associated with the added "SQL Server" workload or any other specific type of workload can also be specified (step 570), such as by specifying parameters such as "3" databases, an/or a "Large" workload profile type, and/or an "OLTP" database type, and/or a "Yes" indicator pertaining to business criticality. When the workload parameters for the new workload are captured, the demands of the newly added workload can be added to the overall demands under consideration.

A historical perspective of usage characteristics can be gathered (step 572) and used in conjunction with a predictive model. Specifically, usage characteristics that pertain to a particular workload or workload type can be used in a query to a predictive model. As an example, a query might be, "My SQL Server has been peaking at 1.2 M IOPS over the past 30 days. Given this historical peak usage and other trends in the system, how much IOPSs demand can I expect to need over the next 6 months?" When the workload parameters for the new workload are specified, and the user is satisfied with the characterization of the workload, the impact of deploying the specific type of workload over the then-current set of hardware can be depicted on the chart (step 567). At any point in time, the workload can be saved by clicking on "Save Workload".

Referring to FIG. 5C2, the view $502_6$ presents a scenario generated by combining a plurality of workloads (at step 576). Specifically, the predicted resource usage results responsive to adding the "SQL Server" workload in view $502_5$ are depicted as the overall runway (e.g., as shown in view $502_6$). A set of resource usage requirements for the combined workloads are calculated (at step 574) and the overall impact of deploying the future workloads is displayed (at step 569). In this example, the "Overall Runway" is reduced from "318 days" to "80 days". Also shown in view $502_6$ is a breakdown of the predicted resource usage characteristics pertaining to the workloads. As pertaining to the SQL workload, a CPU usage of "25 GHz", a memory usage of "50 GB", and a storage usage of "8 TB" are shown. If the resource usage requirements for the combined workloads would require additional hardware to achieve the target runway, then a recommend button can be displayed (step 561). The user can click on a "Recommend" button to accept a set of hardware recommendations that are generated to remediate the deficiencies in the then-current "Hardware" with respect to satisfying the plurality of planned workloads.

Figure 5D:
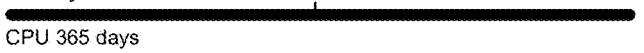

Referring to FIG. 5D, view $502_7$ illustrates the "What-If" scenario that includes display of the effects of accepting the recommended resource allocation operations after clicking the "Recommend" button in view $502_6$ of FIG. 5C2. Specifically, applying the recommended resource allocation operations increases the "Overall Runway" from "80 days" to "365 days". Specifically, and as shown in the "Hardware" section of view $502_7$, the recommended resource allocation operations can comprise deploying an "NX7500" appliance having "2" nodes on "09/30/2016". As further shown by the cursor in view $502_7$, the user can click on a "New Workload" link to add an even further new planned workload to the then-current scenario. Specifically, and as shown in view $502_8$, a "Crawler" workload can be added on "01/01/2017". The "Crawler" workload can be described by various parameters such as a "Daily average index size" of "20" GB or a number of "Cold retention days" of "180". When the workload parameters for the new workload are specified, the workload can be saved by clicking on "Save Workload". Any workload can have a name to form a named workload, and any named workload can have any set of parameters that serve to characterize the deployment and performance characteristics of the workload, which characteristics can be used for mapping to hardware resource requirements.

Referring to FIG. 5E1, a view $502_9$ presents the predicted resource usage results responsive to adding the "Crawler" workload in view $502_8$ of FIG. 5D. Specifically, the "Overall Runway" is reduced from "365 days" to "172 days". Also shown in view $502_9$ are the predicted resource usage characteristics pertaining to the workloads of the scenario (as calculated in step 578). Any one or more workloads and respective resource usage breakdowns can be shown in a list or array. Strictly as one example, the workload "VDIs" has a resource usage breakdown of "40 GHz" (pertaining to CPU demands), "20 GB" (pertaining to memory demands), and "4 TB" (pertaining to storage capacity). The user can view the impact of deploying the workloads of the scenario on the existing hardware (step 580).

As further shown by the cursor in view $502_9$, the user can click on a "Recommend" button to accept the recommended resource allocation operations generated to remediate the limitations inherent in the resource availabilities of the then-current "Hardware" with respect to the predicted resource usages pertaining to the particular scenario (as calculated in step 578).

In some cases, a user might want to consider the "What-If" aspects of deploying a manually-added node. In such a case, the "New Node" screen device in view $502_9$ can be clicked to bring up the shown view 503, which in turn can be used to specific node hardware in terms of a model identification, CPU configuration, memory configuration, etc.

View $502_{10}$ (see FIG. 5E3) illustrates the effect of adding hardware Specifically, deploying the hardware increases the "Overall Runway" from "172 days" to "365 days". Specifically, and as shown in the "Hardware" section of view $502_{10}$, the recommended resource allocation operations can comprise deploying an "NX7500" appliance having "1" node on "12/31/2016". The "Overall Runway" depicts the impact of deploying the workloads of the scenario in combination with the time-ordered deployment of recommended and user-specified hardware (step 582).

Figure 6A:
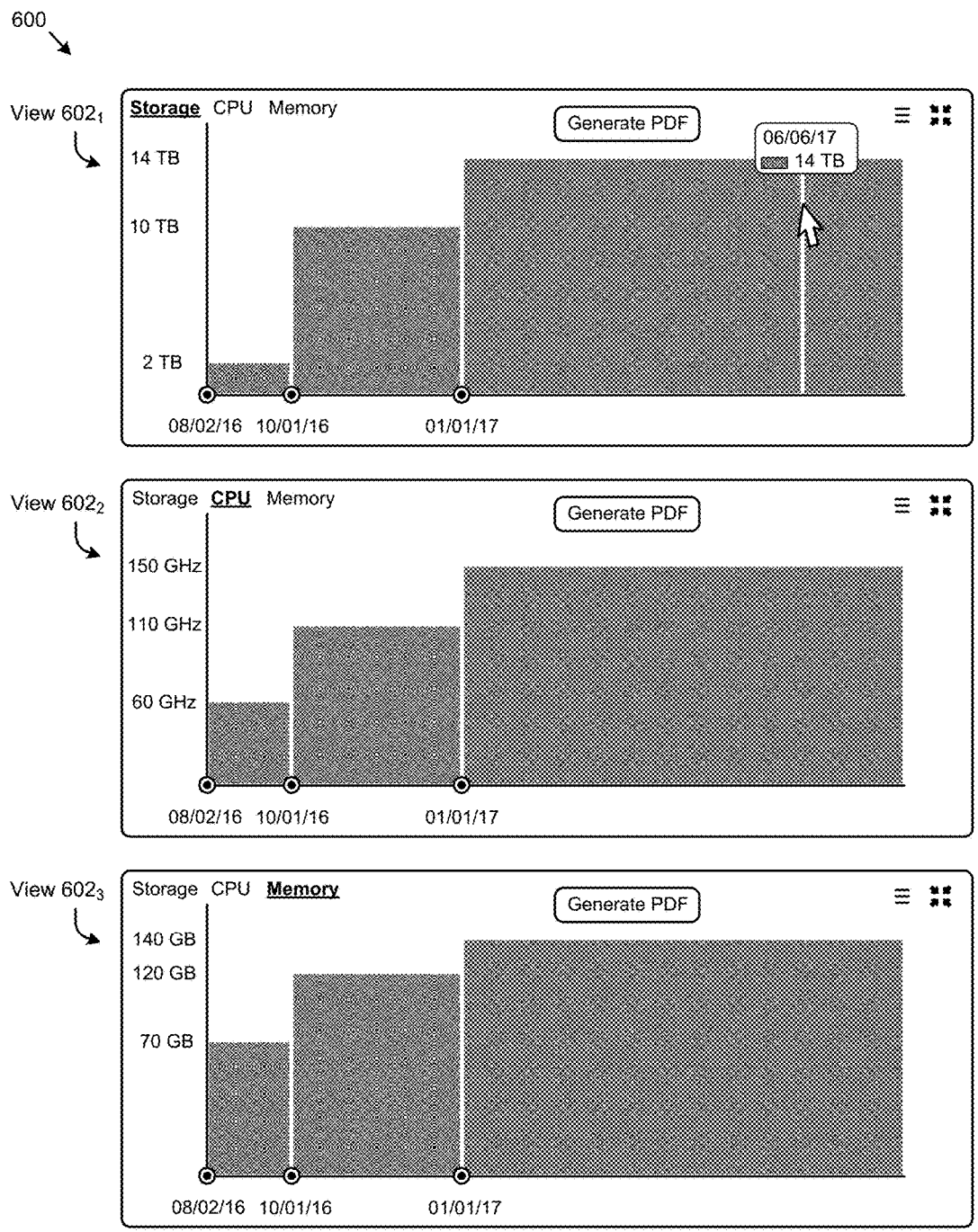
FIG. 6A and FIG. 6B illustrate time-based resource usage views as presented in systems for long-range distributed resource planning, according to some embodiments.
Figure 6B:
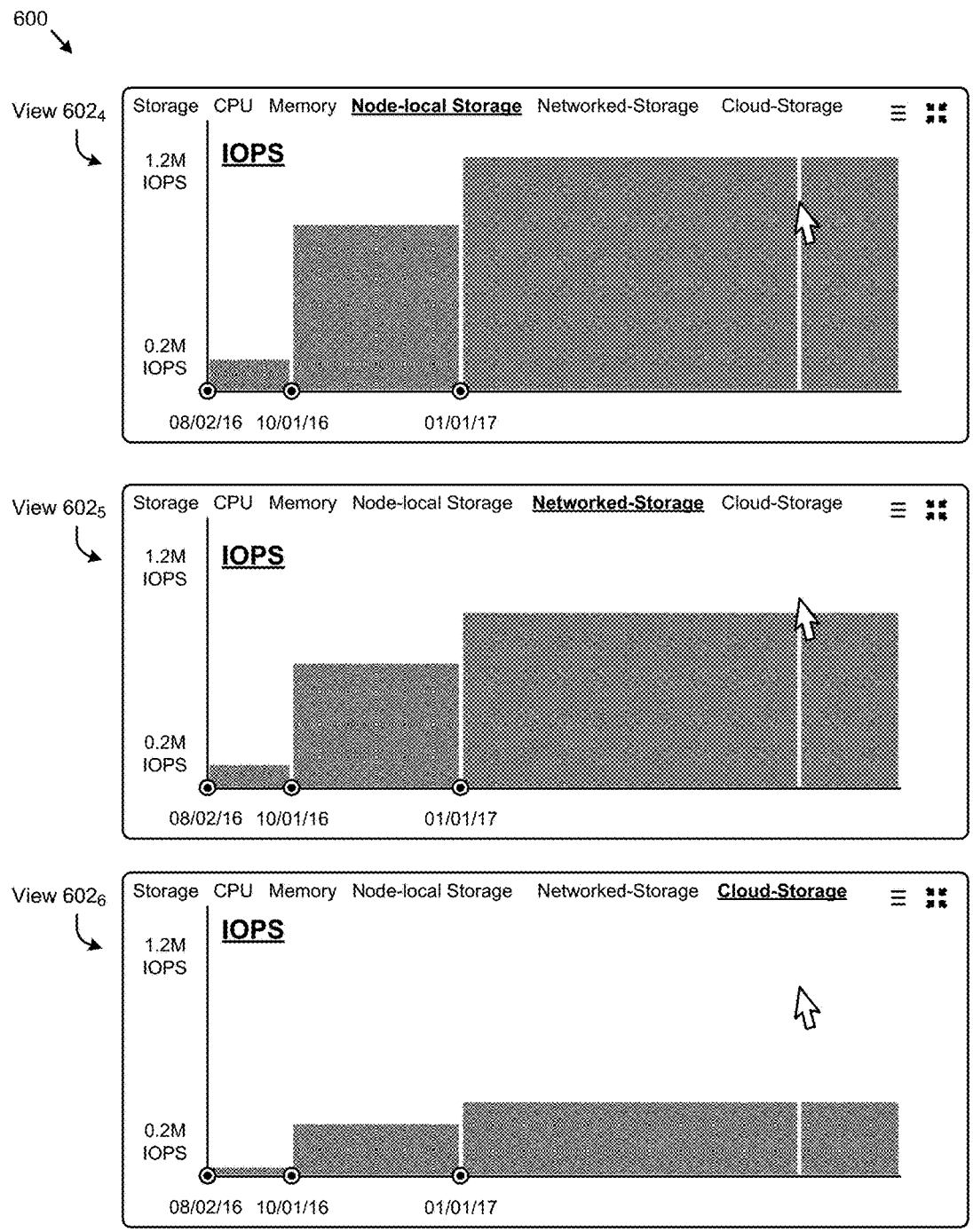

The predicted resource usage characteristics can be presented as a time-based series as shown and described as pertaining to FIG. 6A and FIG. 6B.

FIG. 6A and FIG. 6B illustrate time-based resource usage views 600 as presented in systems for long-range distributed resource planning. As an option, one or more variations of time-based resource usage views 600 or any aspect thereof may be implemented in the context of the architecture and functionality of the embodiments described herein. The time-based resource usage views 600 or any aspect thereof may be implemented in any environment.

The depictions of view $602_1$, view $602_2$, and view $602_3$ in FIG. 6A are representative examples of time-based predicted resource usage characteristics pertaining to storage usage, CPU usage, and memory usage, respectively, as determined by the herein disclosed techniques. As an example, the time-based increases in the predicted usage for each resource can correspond to the moments in time when certain planned workloads are expected to be invoked. As further shown in view $602_1$, certain embodiments might implement a mouseover-drilldown technique that displays certain resource usage details (e.g., usage of "14 TB" on a date of "06/06/17") responsive to the placement of the cursor. A file containing a depiction of the view can be generated at any point in time (e.g., note the "Generate PDF" screen device).

The depictions of view $602_4$, view $602_5$, and view $602_6$ in FIG. 6B are representative examples of time-based predicted resource usage characteristics pertaining to node-local storage IOPS demand, networked storage IOPS demand, and cloud storage IOPS demand, respectively, as determined by the herein disclosed techniques. In this example, the time-based increases in the predicted demand for each type of storage IO corresponds to the moments in time when certain planned workloads are expected to be invoked.

Figure 7A:
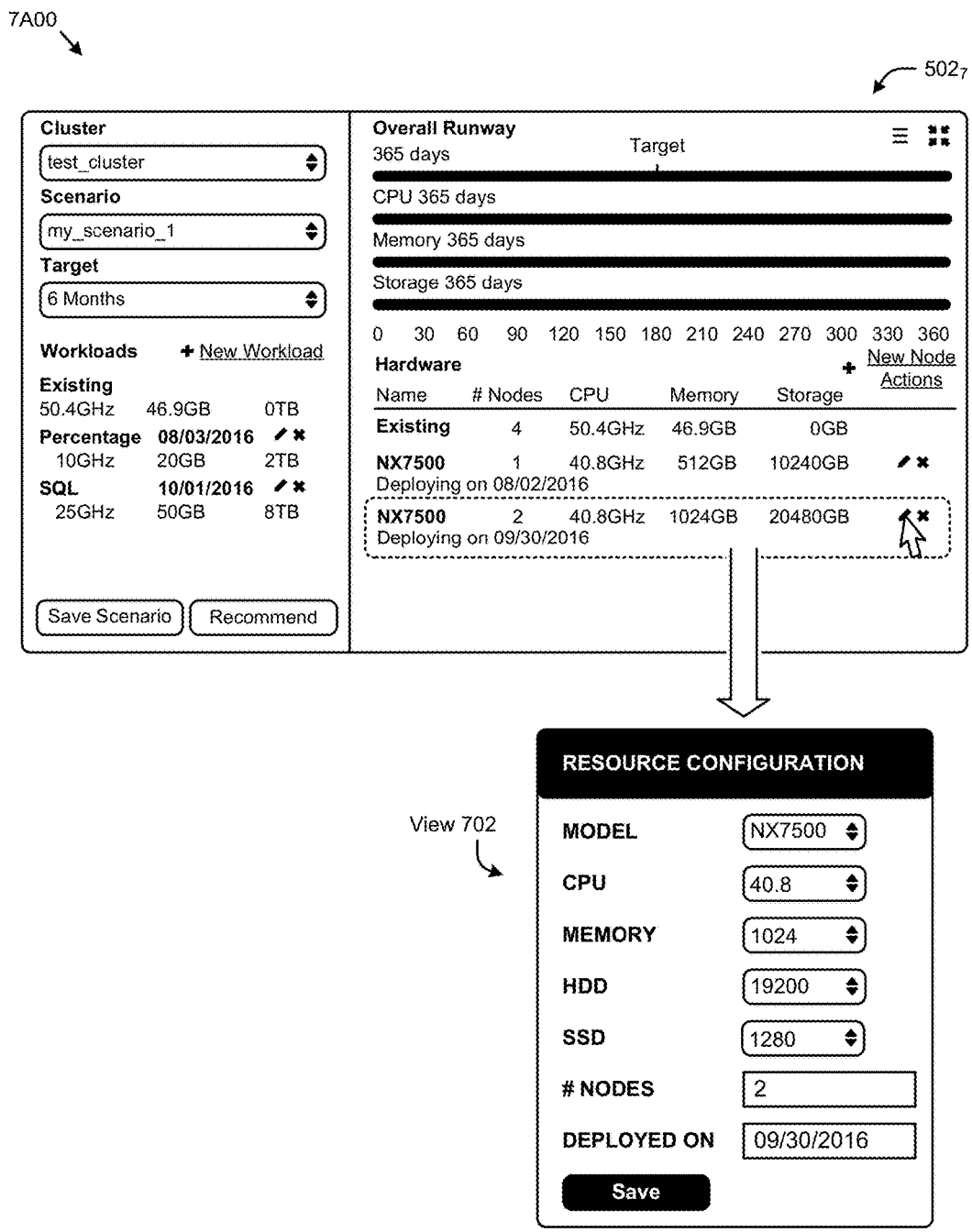
FIG. 7A and FIG. 7B depict resource deployment scenarios as implemented in systems for long-range distributed resource planning using workload modeling, according to some embodiments.
Figure 7B:
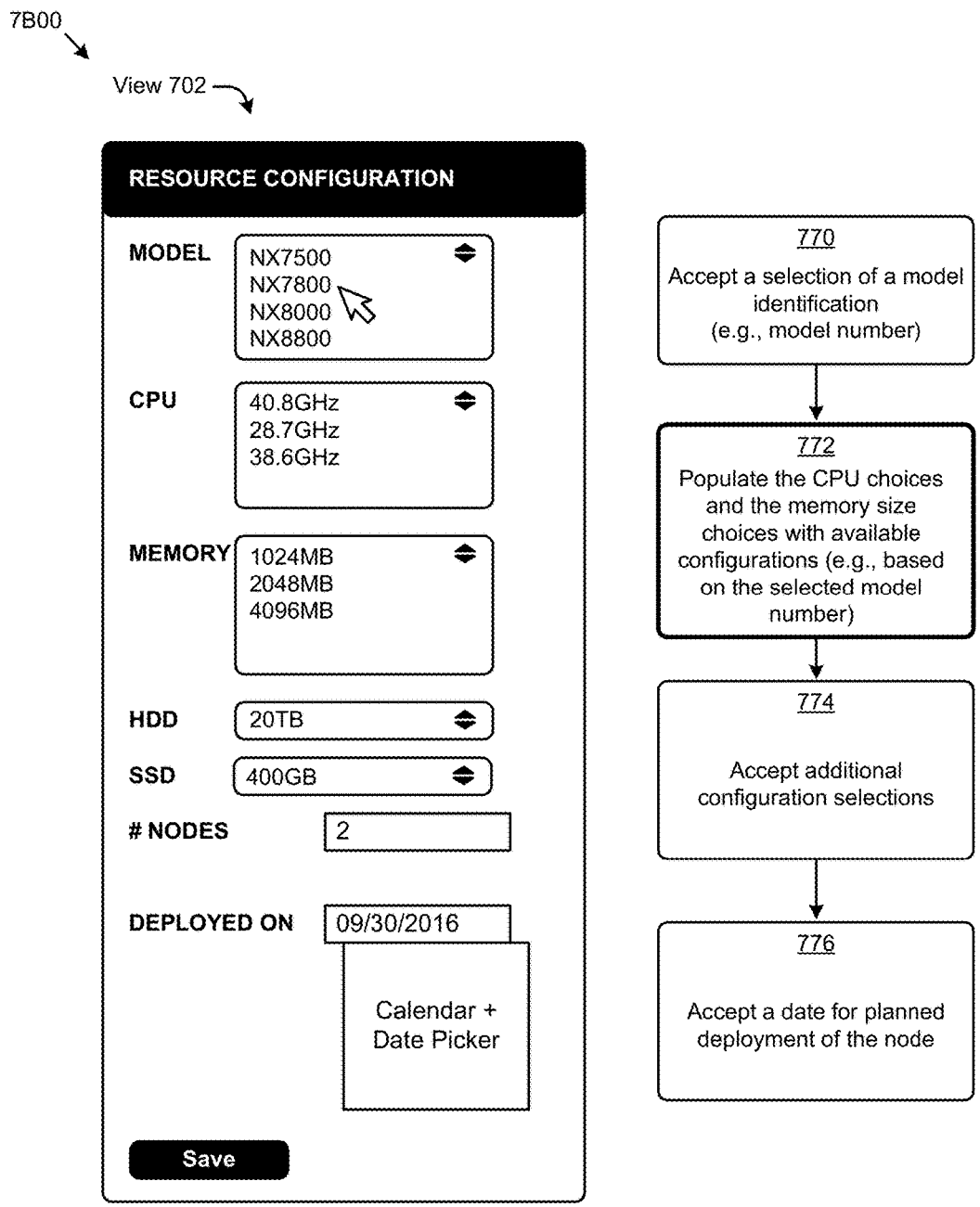

Certain embodiments of a user interface might further facilitate modifying certain parameters associated with various resource allocation operations as shown and described as pertaining to FIG. 7A and FIG. 7B.

FIG. 7A depicts a resource deployment scenario 7A00 as implemented in systems for long-range distributed resource planning using workload modeling. As an option, one or more variations of the shown resource deployment scenario 7A00 or any aspect thereof may be implemented in the context of the architecture and functionality of the embodiments described herein. The resource deployment scenario 7A00 or variations, or any aspect thereof may be implemented in any environment.

Resource deployment scenario 7A00 refers to the view $502_7$ as earlier presented as pertaining to FIG. 5D. More specifically, the "Hardware" section of view $502_7$ indicates at least a portion of the resource allocation operations associated with the selected workload planning scenario (e.g., scenario "my_scenario_1") can comprise deploying an "NX7500" appliance having "2" nodes on "09/30/2016". According to some embodiments, a user might invoke a view 702 to facilitate modification of the aforementioned resource deployment. Specifically, for example, an edit icon might be clicked in view $502_7$ to invoke the view 702. As shown in the example represented by view 702, various configuration parameters pertaining to the appliance to be deployed can be modified, such as parameters pertaining to the computing platform model type, the CPU capacity, the memory capacity, the HDD capacity, the SSD capacity, the number of nodes, the deployment dates, and/or other configuration parameters.

FIG. 7B depicts a resource deployment scenario 7B00 as implemented in systems for long-range distributed resource planning using workload modeling. As an option, one or more variations of the shown resource deployment scenario 7B00 or any aspect thereof may be implemented in the context of the architecture and functionality of the embodiments described herein. The resource deployment scenario 7B00 or variations, or any aspect thereof may be implemented in any environment.

Resource deployment scenario 7B00 depicts the dynamic nature of the user interaction with the screen devices of view 702. As shown, the interaction begins when a user selects a particular model, or accepts a pre-populated model (step 770). Upon selection or confirmation of the model, the screen devices pertaining to the CPU configuration and the memory configuration are populated based on the model selection (step 772). The user can continue to select configuration characteristics of the node, possibly by specifying a capacity for HDD storage, and/or a capacity for SSD storage (step 774). Further, a number of nodes can be specified for deployment on a particular date (step 776). A screen device such as a date picker can be provided to aid in user specification of a deployment date for the configuration. The configuration can be saved with a name or other identification so as to facilitate subsequent retrieval.

ADDITIONAL EMBODIMENTS OF THE DISCLOSURE

Additional Practical Application Examples

Figure 8A:
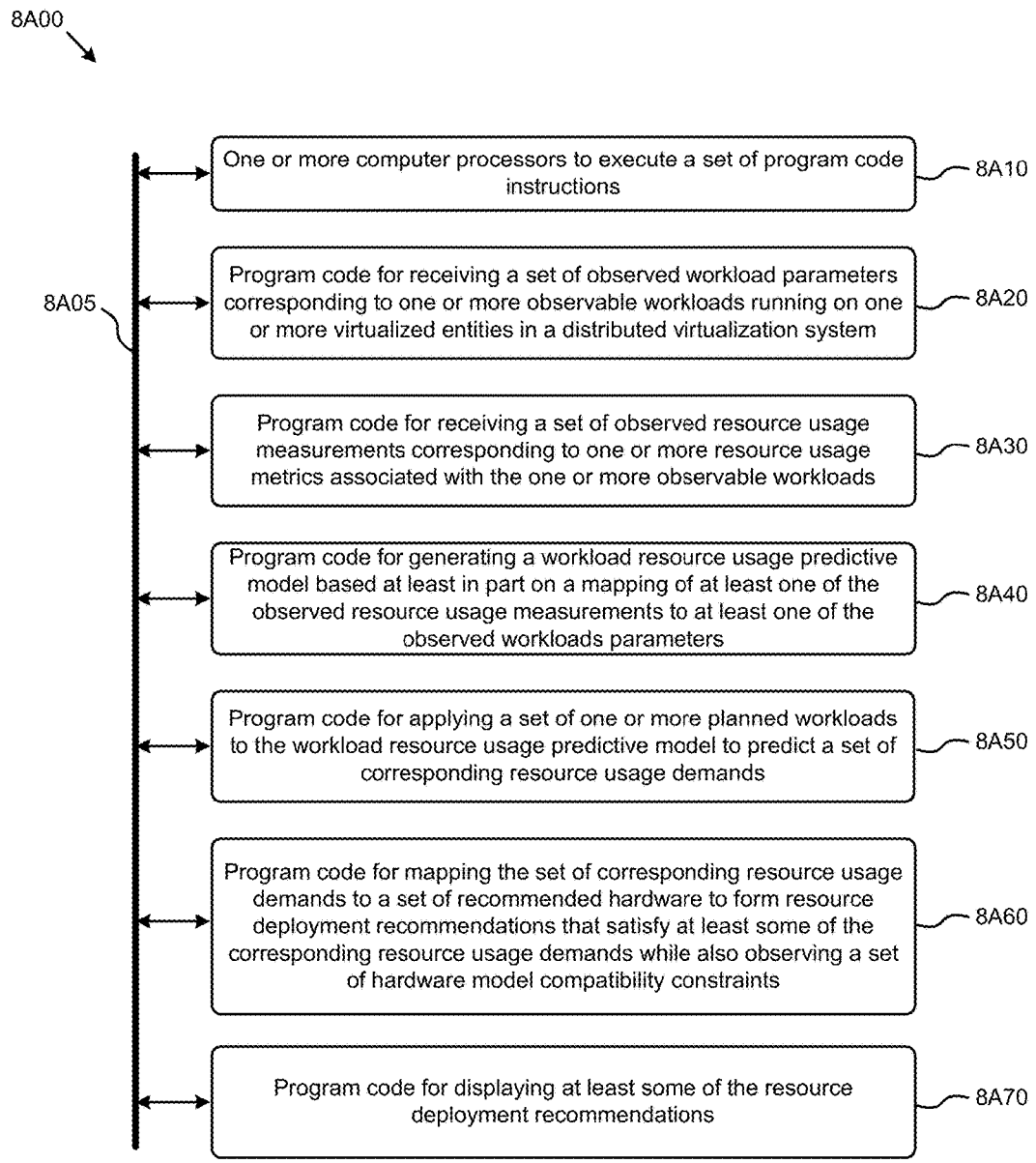
FIG. 8A and FIG. 8B depict system components as arrangements of computing modules that are interconnected to implement certain of the herein-disclosed embodiments.

FIG. 8A depicts a system 8A00 as an arrangement of computing modules that are interconnected to operate cooperatively to implement certain of the herein-disclosed embodiments. This and other embodiments present particular arrangements of elements that individually, and/or as combined, serve to form improved technological processes that account for dynamic workload characteristics when planning resources in distributed virtualization systems over long time horizons. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment. The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims. The shown embodiment implements a portion of a computer system, presented as system 8A00, comprising a computer processor to execute a set of program code instructions (module 8A10) and modules for accessing memory to hold program code instructions to perform: receiving a set of observed workload parameters corresponding to one or more observable workloads running on one or more virtualized entities in a distributed virtualization system (module 8A20); receiving a set of observed resource usage measurements corresponding to one or more resource usage metrics associated with the one or more observable workloads (module 8A30); generating a workload resource usage predictive model based at least in part on a mapping of at least one of the observed resource usage measurements to at least one of the observed workloads parameters (module 8A40); applying a set of one or more planned workloads to the workload resource usage predictive model to predict a set of corresponding resource usage demands (module 8A50); mapping the set of corresponding resource usage demands to a set of recommended hardware to form resource deployment recommendations that satisfy at least some of the corresponding resource usage demands while also observing a set of hardware model compatibility constraints (module 8A60); and displaying at least some of the resource deployment recommendations (module 8A70).

Variations of the foregoing may include more or fewer of the shown modules, and variations may perform more or fewer (or different) steps, and/or may use data elements in more, or in fewer (or different) operations.

Figure 8B:
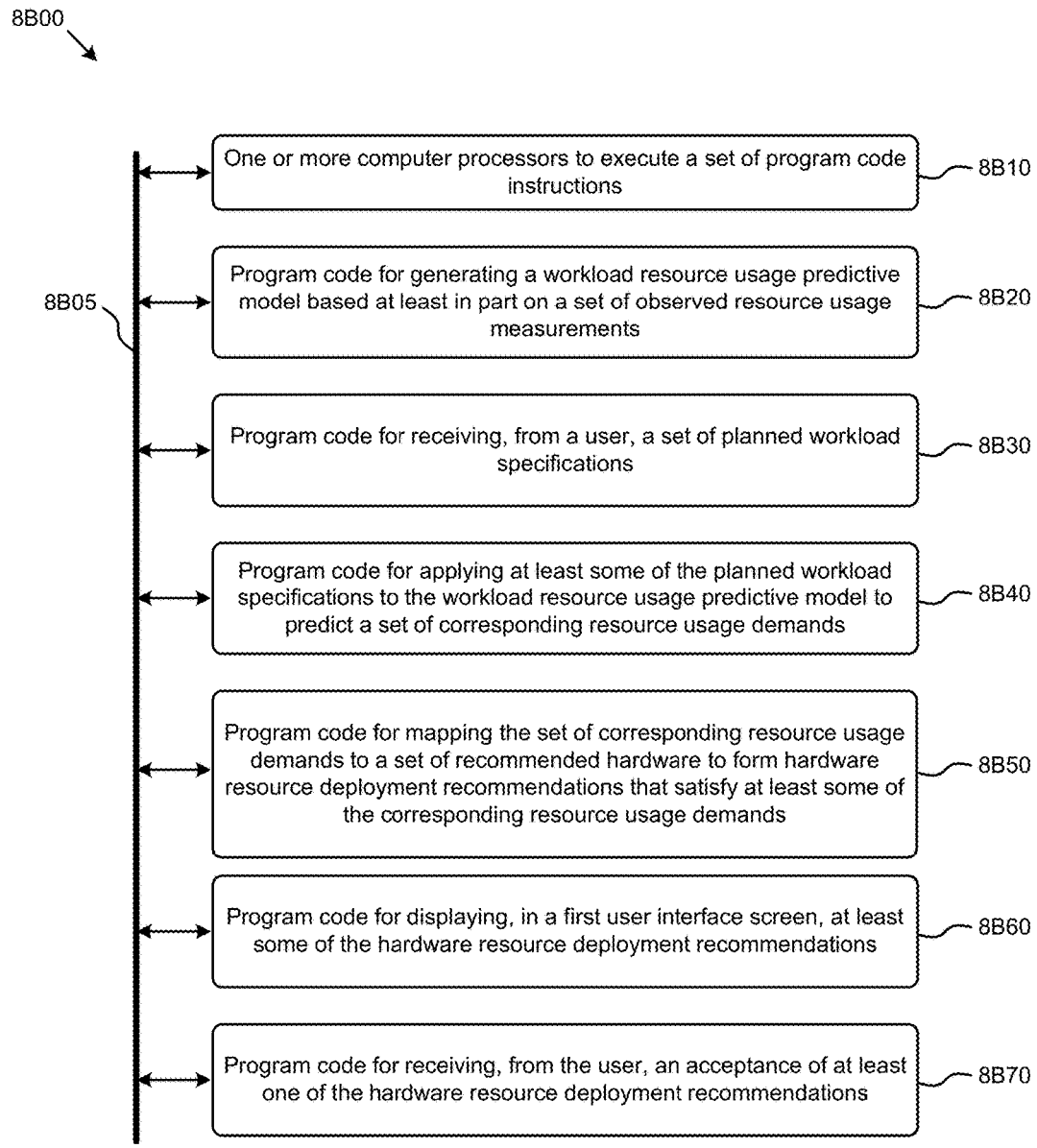

FIG. 8B depicts a system 8B00 as an arrangement of computing modules that are interconnected to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (module 8B10) and modules for accessing memory to hold program code instructions to perform: generating a workload resource usage predictive model based at least in part on a set of observed resource usage measurements (module 8B20); receiving, from a user, a set of planned workload specifications (module 8B30); applying at least some of the planned workload specifications to the workload resource usage predictive model to predict a set of corresponding workload resource usage predictions of workload demands (module 8B40); mapping the set of corresponding resource usage demands to a set of recommended hardware to form hardware resource deployment recommendations that satisfy at least some of the corresponding resource usage demands (module 8B50); displaying, in a first user interface screen, at least some of the hardware resource deployment recommendations (module 8B60); and receiving, from the user, an acceptance of at least one of the hardware resource deployment recommendations (module 8B70).

Variations of the foregoing may include more or fewer of the shown modules, and variations may perform more or fewer (or different) steps, and/or may use data elements in more, or in fewer (or different) operations.

System Architecture Overview

Additional System Architecture Examples

Figure 9A:
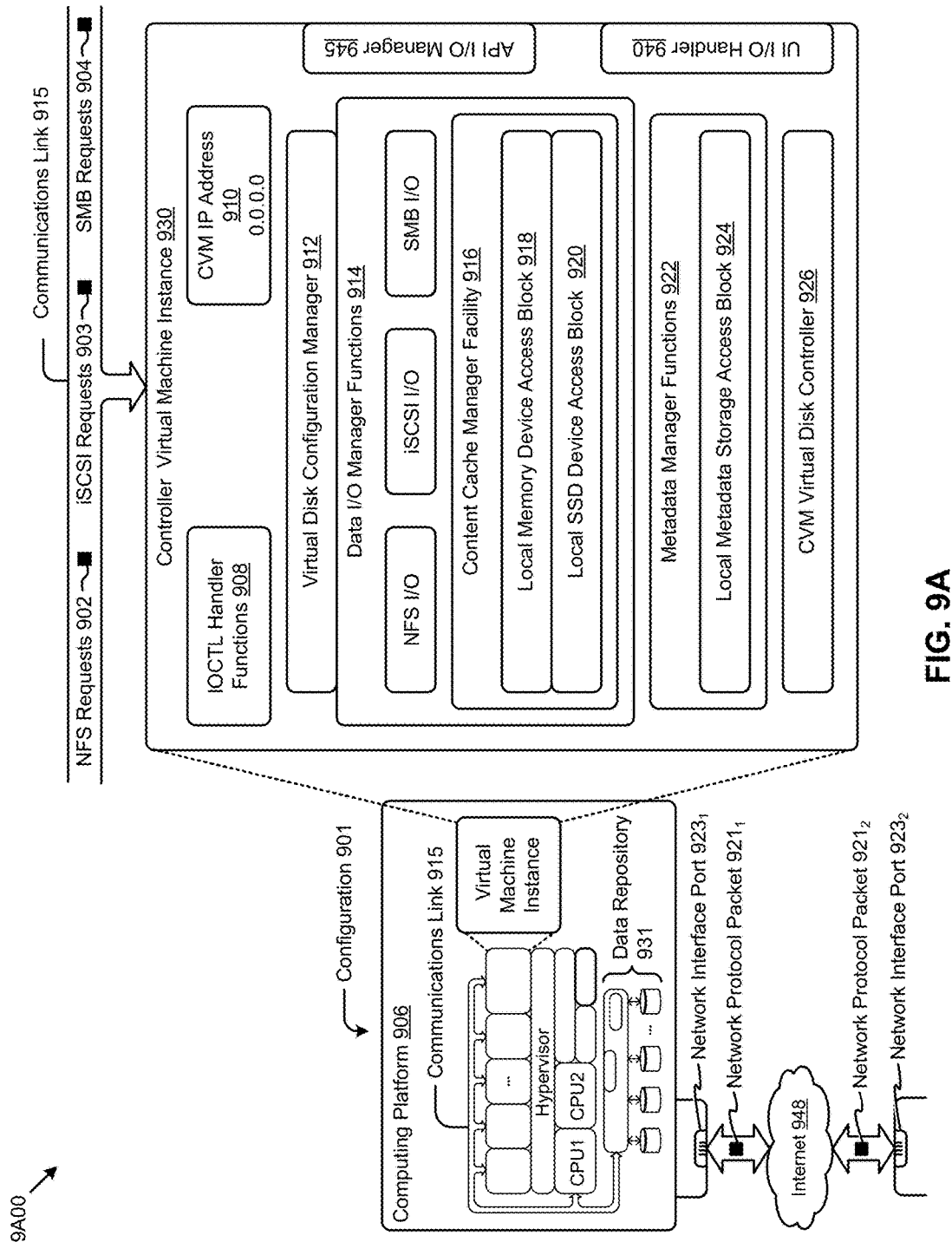
FIG. 9A and FIG. 9B depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 9A00 comprises a collection of interconnected components suitable for implementing embodiments of the present disclosure and/or for use in the herein-described environments. Moreover, the shown virtual machine architecture 9A00 includes a virtual machine instance in a configuration 901 that is further described as pertaining to the controller virtual machine instance 930. A controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL functions 908) that interface to other functions such as data IO manager functions 914 and/or metadata manager functions 922. As shown, the data IO manager functions can include communication with a virtual disk configuration manager 912 and/or can include direct or indirect communication with any of various block IO functions (e.g., NFS IO, iSCSI IO, SMB IO, etc.).

In addition to block IO functions, the configuration 901 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through the shown API IO manager 945.

The communications link 915 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 930 includes a content cache manager facility 916 that accesses storage locations, possibly including local dynamic random access memory (DRAM) (e.g., through the local memory device access block 918) and/or possibly including accesses to local solid state storage (e.g., through local SSD device access block 920).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 931, which in turn can be formatted into any one or more storage areas, and which can comprise parameterized storage accessible by a key (e.g., a filename, a table name, a block address, an offset address, etc.). An external data repository 931 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 924. The external data repository 931 can be configured using a CVM virtual disk controller 926, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 901 can be coupled by a communications link 915 (e.g., backplane, LAN, PTSN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port 923$_1$ and network interface port 923$_2$). The configuration 901 can be addressed through one or more network interface ports using an IP address. Any operational element within computing platform 906 can perform sending and receiving operations using any of a range of network protocols, possibly including network protocols that send and receive packets (e.g., network protocol packet 921$_1$ and network protocol packet 921$_2$).

The computing platform 906 may transmit and receive messages that can be composed of configuration data, and/or any other forms of data and/or instructions organized into a data structure (e.g., communications packets). In some cases, the data structure includes program code instructions (e.g., application code) communicated through Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or results of executing program code can be delivered to a particular user via a download (e.g., a download from the computing platform 906 over the Internet 948 to an access device).

The configuration 901 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster is defined by a mechanical structure such as a cabinet or chassis or rack that hosts a finite number of mounted-in computing units. A computing unit in a rack can take on a role as a server, or as a storage unit, or as a networking unit, or any combination therefrom. In some cases a unit in a rack is dedicated to provision of power to the other units. In some cases a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one another over a WAN (e.g., when geographically distal) or LAN (e.g., when geographically proximal).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to long-range distributed resource planning using workload modeling. In some embodiments, a module may include one or more state machines and/or combinational logic used to implement or facilitate the operational and/or performance characteristics pertaining to long-range distributed resource planning using workload modeling.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of long-range distributed resource planning using workload modeling). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to long-range distributed resource planning using workload modeling, and/or for improving the way data is manipulated when performing computerized operations pertaining to implementing a workload resource usage predictive model and/or for mapping workload parameters to resource usage metrics so as to facilitate time-based resource planning in a distributed virtualization system.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 9B:
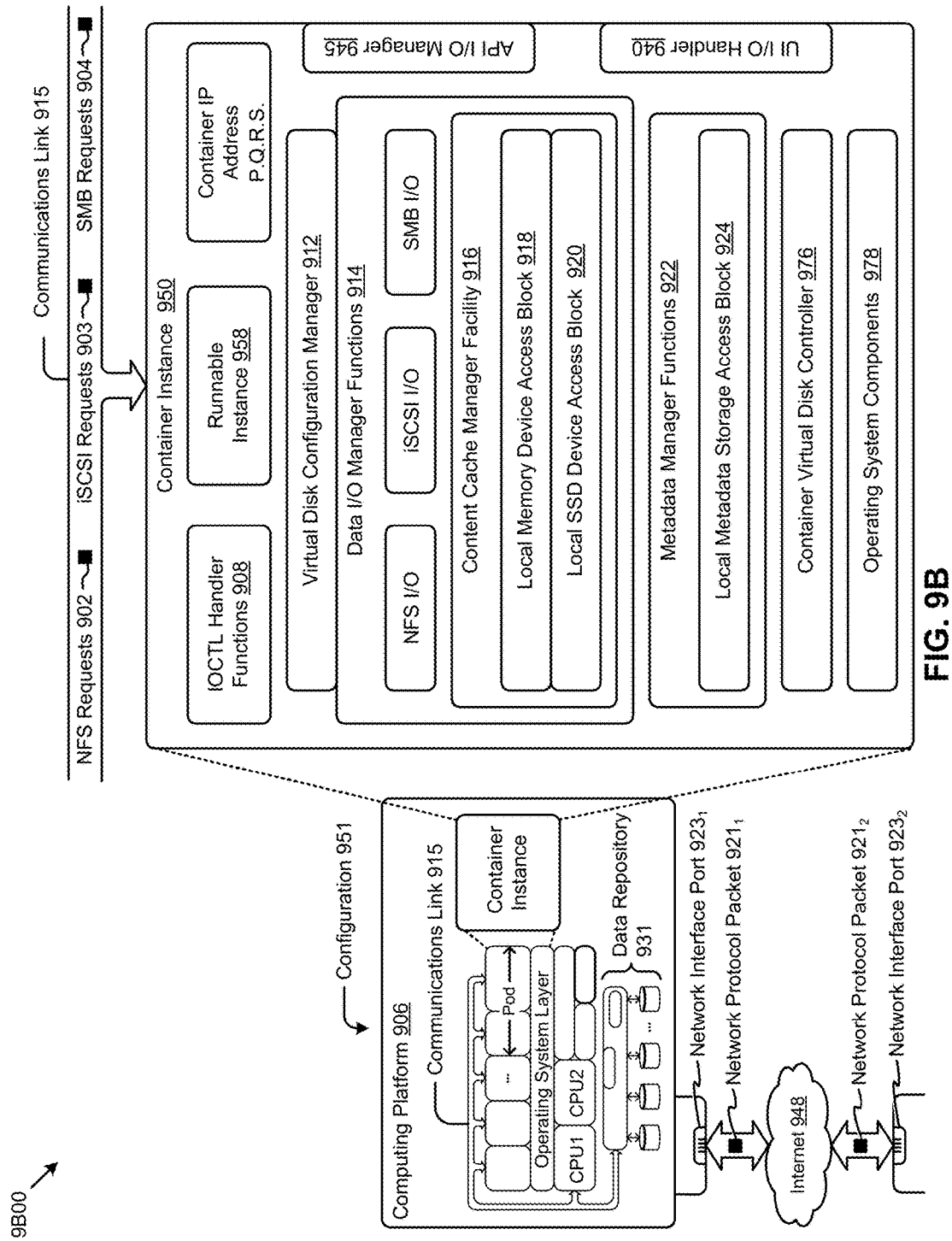

FIG. 9B depicts a virtualized controller implemented by a containerized architecture 9B00. The containerized architecture comprises a collection of interconnected components suitable for implementing embodiments of the present disclosure and/or for use in the herein-described environments. Moreover, the shown containerized architecture 9B00 includes a container instance in a configuration 951 that is further described as pertaining to the container instance 950. The configuration 951 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 950). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 978, however such a separate set of operating system components need not be provided. As an alternative, a container can include a runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
receiving a first set of workload parameters corresponding to a first workload executing on a first node of a first type in a first cluster;
receiving a second set of workload parameters corresponding to a second workload executing on a second node of the first type in a second cluster;
generating a single predictive model based at least on both the first set of workload parameters associated with the first cluster and the second set of workload parameters associated with the second cluster;
emitting a first resource deployment recommendation and a second resource deployment recommendation based at least in part on resource usage predictions generated by the single predictive model;

wherein the second resource deployment recommendation is different from the first resource deployment recommendation; and displaying the first resource deployment recommendation or the second resource deployment recommendation.

2. The method of claim 1, wherein the first resource deployment recommendation or the second resource deployment recommendation is based at least in part on a hardware model compatibility.

3. The method of claim 1, wherein the first resource deployment recommendation or the second resource deployment recommendation is based at least in part on one or more resource allocation rules comprising a replication factor, a compression factor.

4. The method of claim 3, wherein the single predictive model maps a set of planned workload parameters to a set of predicted resource usage characteristics.

5. The method of claim 3, wherein the single predictive model is associated with nodes of the first type.

6. The method of claim 1, wherein the displaying of the first resource deployment recommendation or the second resource deployment recommendation includes displaying a time-based series of deployment events.

7. The method of claim 6, wherein the single predictive model is one of a plurality of predictive models associated with respective types of nodes.

8. The method of claim 1, wherein the displaying the first resource deployment recommendation or the second resource deployment recommendation further comprises displaying a target date.

9. The method of claim 1, wherein the first resource deployment recommendation comprises a node of a first type, and the second resource deployment recommendation comprises a node of a second type.

10. The method of claim 1, wherein the first resource deployment recommendation and the second resource deployment recommendation are generated by at least mapping at least some of the resource usage predictions generated by the single predictive model to a plurality of node types.

11. A non-transitory computer readable medium having stored thereon a sequence of instructions which, when executed by a processor performs a set of acts comprising:

receiving a first set of workload parameters corresponding to a first workload executing on a first node of a first type in a first cluster;

receiving a second set of workload parameters corresponding to a second workload executing on a second node of the first type in a second cluster;

generating a single predictive model based at least on both the first set of workload parameters associated with the first cluster and the second set of workload parameters associated with the second cluster;

emitting a first resource deployment recommendation and a second resource deployment recommendation based at least in part on resource usage predictions generated by the single predictive model, wherein the second resource deployment recommendation is different from the first resource deployment recommendation; and displaying the first resource deployment recommendation or the second resource deployment recommendation.

12. The computer readable medium of claim 11, wherein the first resource deployment recommendation or the second resource deployment recommendation is based at least in part on a hardware model compatibility.

13. The computer readable medium of claim 11, wherein the first resource deployment recommendation or the second resource deployment recommendation is based at least in part on one or more resource allocation rules comprising a replication factor, a compression factor.

14. The computer readable medium of claim 13, wherein the single predictive model maps a set of planned workload parameters to a set of predicted resource usage characteristics.

15. The computer readable medium of claim 13, wherein the single predictive model is associated with nodes of the first type.

16. The computer readable medium of claim 11, wherein the displaying of the first resource deployment recommendation or the second resource deployment recommendation includes displaying a time-based series of deployment events.

17. The computer readable medium of claim 16, wherein the single predictive model is one of a plurality of predictive models associated with respective types of nodes.

18. The computer readable medium of claim 11, wherein the displaying the first resource deployment recommendation or the second resource deployment recommendation further comprises displaying a target date.

19. A system comprising:

a storage medium having stored thereon a sequence of instructions; and processor that executes the sequence of instructions to cause a set of acts comprising:

receiving a first set of workload parameters corresponding to a first workload executing on a first node of a first type in a first cluster;

receiving a second set of workload parameters corresponding to a second workload executing on a second node of the first type in a second cluster;

generating a single predictive model based at least on both the first set of workload parameters associated with the first cluster and the second set of workload parameters associated with the second cluster;

emitting a first resource deployment recommendation and a second resource deployment recommendation based at least in part on resource usage predictions generated by the single predictive model, wherein the second resource deployment recommendation is different from the first resource deployment recommendation; and displaying the first resource deployment recommendation or the second resource deployment recommendation.

20. The system of claim 19, wherein the first resource deployment recommendation or the second resource deployment recommendation is based at least in part on a hardware model compatibility.

* * * * *